(12) United States Patent
Harada et al.

(10) Patent No.: US 8,948,068 B2
(45) Date of Patent: *Feb. 3, 2015

(54) WIRELESS STATION, INTERFERENCE AVOIDANCE METHOD, AND SYSTEM FOR INTERFERENCE AVOIDANCE

(75) Inventors: Hiroki Harada, Yokosuka (JP); Hiromasa Fujii, Yokosuka (JP); Shunji Miura, Yokohama (JP); Hidetoshi Kayama, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 392 days.

This patent is subject to a terminal disclaimer.

(21) Appl. No.: 13/350,079

(22) Filed: Jan. 13, 2012

(65) Prior Publication Data
US 2012/0213102 A1 Aug. 23, 2012

(30) Foreign Application Priority Data
Feb. 17, 2011 (JP) .................................. 2011-032649

(51) Int. Cl.
*H04W 72/04* (2009.01)
*H04W 72/08* (2009.01)
(Continued)

(52) U.S. Cl.
CPC .......... *H04W 72/082* (2013.01); *H04W 72/085* (2013.01); *H04W 72/1215* (2013.01); *H04W 72/0406* (2013.01); *H04W 16/14* (2013.01)
USPC ............ 370/310; 370/445; 370/462; 375/296

(58) Field of Classification Search
None
See application file for complete search history.

(56) References Cited

U.S. PATENT DOCUMENTS 7,634,276 B2 * 12/2009 Liu et al. ....................... 455/450
2003/0107512 A1 * 6/2003 McFarland et al. ........... 342/159
(Continued)

FOREIGN PATENT DOCUMENTS

| CN | 101841820 A | 9/2010 |
| JP | 2010-213243 | 9/2010 |
| JP | 2010-233095 | 10/2010 |

OTHER PUBLICATIONS

Paul D. Sutton "Cyclostationary Signatures in Practical Cognitive Radio Applications", IEEE Journal on Selected Areas in Communications (JSAC), 2008, 12 Pages.*

(Continued)

*Primary Examiner* — Ayaz Sheikh
*Assistant Examiner* — Tarell Hampton
(74) *Attorney, Agent, or Firm* — Oblon, Spivak, McClelland, Maier & Neustadt, L.L.P.

(57) ABSTRACT

A wireless station in a second communication system, with at least a portion of a first frequency band used in a first communication system and a portion of a second frequency band used in the second communication system being shared or neighboring, the wireless station including a waveform characteristic quantity extracting unit that extracts a waveform characteristic quantity which shows a statistical characteristic of a signal received from the first communication system; a communication parameter determining unit that determines communication parameters to be used for the wireless station in the second communication system depending on a determination result of whether the extracted waveform characteristic quantity is of a predetermined waveform characteristic quantity for reducing an interference; and a transmission and reception unit that transmits and receives a wireless communication signal in the second communication system in accordance with the determined communication parameters.

7 Claims, 22 Drawing Sheets

(51) Int. Cl.
*H04W 16/14* (2009.01)
*H04W 72/12* (2009.01)

(56) References Cited

U.S. PATENT DOCUMENTS

| | | | |
|---|---|---|---|
| 2003/0214430 A1* | 11/2003 | Husted et al. | 342/57 |
| 2006/0014496 A1* | 1/2006 | Klein | 455/63.1 |
| 2009/0054002 A1* | 2/2009 | Urushihara et al. | 455/67.13 |
| 2009/0098904 A1* | 4/2009 | Fujii et al. | 455/552.1 |
| 2009/0170542 A1 | 7/2009 | Chen et al. | |
| 2009/0225887 A1* | 9/2009 | Sutton | 375/267 |
| 2009/0296854 A1* | 12/2009 | Yamano et al. | 375/296 |
| 2010/0135433 A1* | 6/2010 | Maeda | 375/295 |
| 2010/0233963 A1 | 9/2010 | Harada et al. | |
| 2010/0248638 A1 | 9/2010 | Harada et al. | |

OTHER PUBLICATIONS

"Overload Indicator Handling for LTE", Nokia Siemens Networks, Nokia, 3GPP TSG RAN WG1 #50 Meeting, R1-073674, Athens, Greece, Aug. 20-24, 2007, pp. 1-6.

Extended Search Report issued May 3, 2012 in European Patent Application No. 12153027.3-2412.

Chinese Office Action issued Feb. 26, 2014, in China Patent Application No. 201210031283.7 (with English translation).

Office Action issued Sep. 9, 2014 in Chinese Patent Application No. 2012-10031283.7 (with English translation).

Japanese Office Action issued Nov. 18, 2014 in Japanese Application No. 2011-032649 with English translation, 5 pages.

* cited by examiner

WIRELESS STATION, INTERFERENCE AVOIDANCE METHOD, AND SYSTEM FOR INTERFERENCE AVOIDANCE

BACKGROUND OF THE INVENTION

1. Field of the Invention

An embodiment of the present invention relates to a wireless station, an interference avoidance method, and a system for interference avoidance.

2. Description of the Related Art

When wireless stations communicate with each other in a wireless communication system, it may be required to properly manage resources such as frequencies and timings so as to avoid interference. In a case of a Long Term Evolution (LTE) based communication system, plural base stations are connected with each other through X2 interfaces. When the quality of the communication of a base station located at an end portion of a cell is degraded, the base station notifies the neighboring base stations of an occurrence of interference at a specific frequency (namely, a resource block). The notification is performed using an overload indicator. Non-Patent Document 1 (3GPP RAN1 R1-073674, "Overload Indicator Handling for LTE," Nokia Siemens Networks, Nokia) discloses the overload indicator. The neighboring base stations perform scheduling that tries to avoid allocating the frequency (the resource block) indicated by the overload indicator to a user located at the end portion of the cell. In this manner, the quality of the communication at the end portion of the cell is improved. This method can be performed when the plural base stations can communicate with each other. This method is advantageous for reducing intercellular interferences within the same system. Conversely, when the base stations are not connected through such interfaces, this method can not be applied. Namely, with this method, it is difficult to reduce interference between different systems.

SUMMARY OF THE INVENTION

An object of an embodiment of the present invention is to ensure that interference can be reduced easily and quickly, when plural communication systems are using frequency bands, in which at least portions of the frequency bands being shared or neighboring to each other are similar, and when a communication performed by a wireless station in a first communication system is interfered by a wireless station of a second communication system.

In one aspect, there is provided a wireless station in a second communication system, at least a portion of a first frequency band used in a first communication system and a portion of a second frequency band used in the second communication system being shared or neighboring, the wireless station including a waveform characteristic quantity extracting unit that extracts a waveform characteristic quantity which shows a statistical characteristic of a signal received from the first communication system; a communication parameter determining unit that determines communication parameters to be used for the wireless station in the second communication system depending on a determination result of whether the extracted waveform characteristic quantity is a predetermined waveform characteristic quantity for reducing an interference; and a transmission and reception unit that transmits and receives a wireless communication signal in the second communication system in accordance with the determined communication parameters.

In another aspect, there is provided a method of avoiding an interference between a first communication system and a second communication system, with at least a portion of a first frequency band used in the first communication system and a portion of a second frequency band used in the second communication system being shared or neighboring, the method including a step for extracting a waveform characteristic quantity, the waveform characteristic quantity showing a statistical characteristic of a signal received from the first communication system; a step for determining communication parameters to be used for a communication of the wireless station in the second communication system depending on a determination result of whether the extracted waveform characteristic quantity is of a predetermined waveform characteristic quantity for reducing an interference; and a step for transmitting and receiving a wireless communication signal in the second communication system in accordance with the determined communication parameters.

In another aspect, there is provided a system comprising at least a first communication system and a second communication system, with at least a portion of a first frequency band used in the first communication system and a portion of a second frequency band used in the second communication system being shared or neighboring. A first wireless station in the first communication system includes a monitoring unit that monitors a reception level of a desired signal used for a communication with a first destination; a signal generating unit that generates a transmission signal including a predetermined waveform characteristic quantity for reducing an interference when the reception level is lower than a predetermined value; and a transmission unit that transmits the transmission signal. A second wireless station in the second communication system includes a waveform characteristic quantity extracting unit that extracts a waveform characteristic quantity, the waveform characteristic quantity showing a statistical characteristic of a signal received from the first communication system; a communication parameter determining unit that determines communication parameters to be used for a communication of the second wireless station in the second communication system depending on a determination result of whether the extracted waveform characteristic quantity is the predetermined waveform characteristic quantity for reducing the interference; and a transmission and reception unit that transmits and receives a wireless communication signal in the second communication system in accordance with the determined communication parameters.

According to the embodiment of the present invention, when plural communication systems are using frequency bands, with at least portions of the frequency bands being shared or neighboring to each other, and when a communication performed by a wireless station of a first communication system is interfered by a second communication system, interference can be reduced easily and quickly.

Other objects, features and advantages of embodiments of the present invention will become more apparent from the following detailed description when read in conjunction with the accompanying drawings.

DESCRIPTION OF THE PREFERRED EMBODIMENTS

Patent Document 1 (Japanese Published Unexamined Application 2010-233095) discloses another example of a technique to reduce interference. In this method, when determining a radio resource to be used by a network (NW) connected wireless station which is trying to start a communication with a destination wireless station, for a waveform characteristic quantity specified by the NW connected wireless station, a wave form characteristic quantity analyzed and reported from the destination wireless station is considered. Since the destination wireless station monitors (performs sensing of) a surrounding condition based on waveform characteristic quantities representing statistical characteristics specific to communication systems, the destination wireless station can properly determine types of signals (communication systems) present in the surrounding area. This is a technique for properly determining a radio resource to be used prior to the NW connected wireless station starting the communication with the destination wireless station. Therefore, when another wireless station is interfered by a communication between the NW connected wireless station and the destination wireless station after the communication has been started, it is difficult to properly regulate the interference.

At the time when this application is submitted, it has been gradually realized that plural communication system use a shared frequency band or neighboring frequency bands so as to efficiently utilize communication resources as much as possible. In such a case, it is especially important to reduce interference among the communication systems.

An embodiment of the present invention is explained based on the following aspects.

1. Wireless communication system
2. Interfered wireless station
3. Interfering wireless station
4. Operation example
5. Specific methods for attaching waveform characteristic quantity
 5.1 Transmission of identical signals by plural subcarriers
 5.2 Application of phase rotations to subcarriers
 5.3 Application of phase rotations to duplicated signals
 5.4 Utilization of time shift
 5.5 Utilization of cyclic shift Embodiment 1

1. Wireless Communication System

Figure 1:
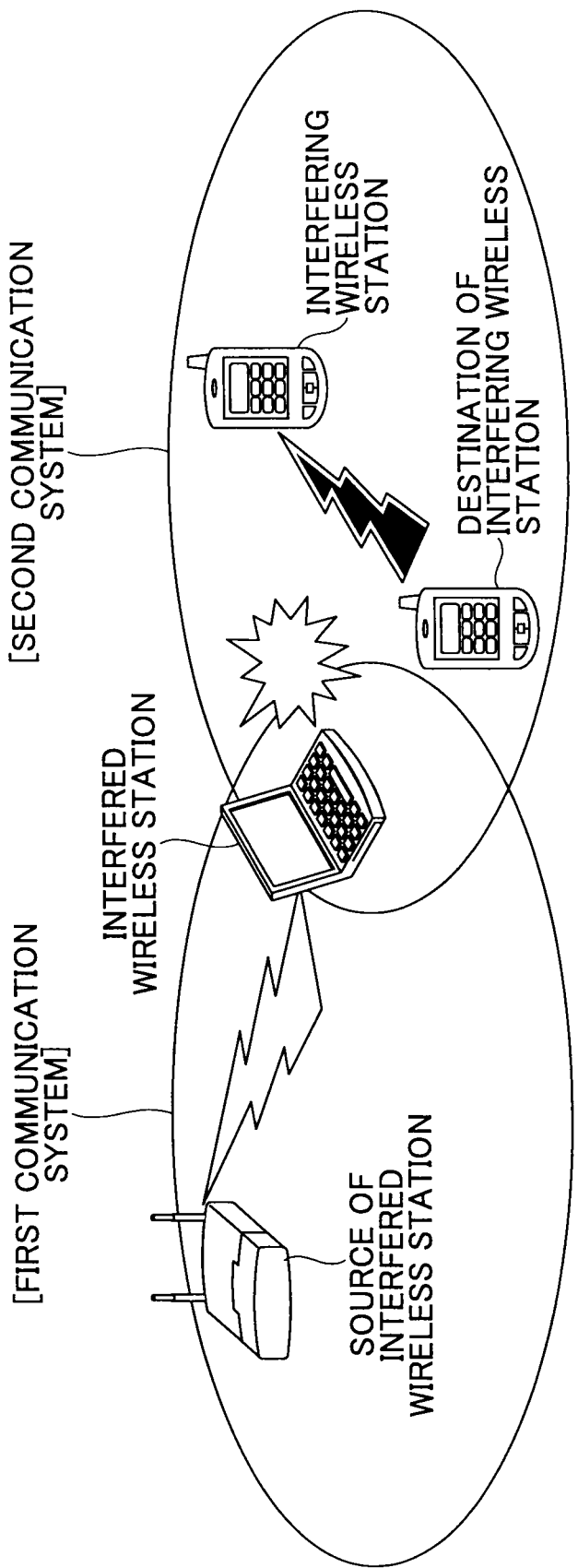
FIG. 1 is a schematic diagram of a wireless communication system used in an embodiment.

FIG. 1 is a schematic diagram illustrating a wireless communication system used in the embodiment. The wireless communication system includes a first communication system and a second communication system. A first service area of the first communication system is indicated by a first elliptical area in the figure. Similarly, a second service area of the second communication system is indicated by a second elliptical area in the figure. In each of the first communication system and the second communication system, plural wireless stations perform communications. For the sake of simplicity of illustration, two wireless stations are communicating in the first communication system and two wireless stations are communicating in the second communication system. However, the number of communication systems and the number of wireless stations are arbitrary. Each of the wireless stations can be any device that enables a communication by a user. Each of the wireless stations can be a mobile station or a fixed station. Specifically, each of the wireless stations may be a device that can be used by the user, such as a user device, a cellular phone, an information terminal, a high performance mobile phone, a smart phone, a personal digital assistant, a mobile personal computer, a desktop computer and the like. Alternatively, each of the wireless stations may be a device that enables a communication by the user, such as a base station or an access point. The wireless stations are not limited to the above listed specific examples.

Figure 2:
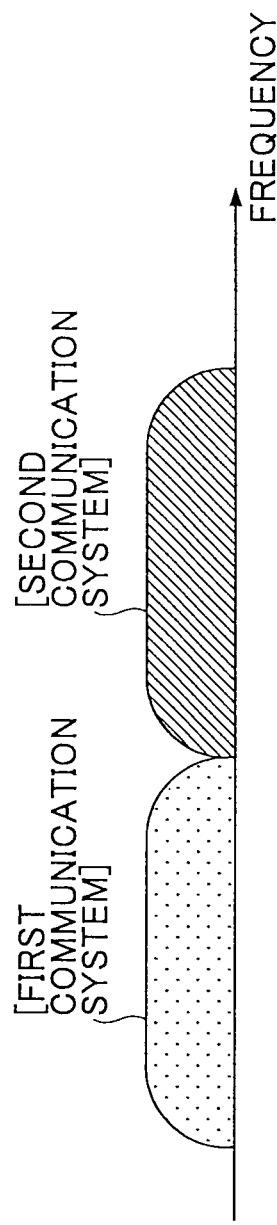
FIG. 2 is a diagram showing an example of frequency band usages.

A portion of a first frequency band used in the first communication system and a portion of a second frequency band used in the second communication system are common or neighboring to each other. Here, both the first communication system and the second communication system are included in the wireless communication system. In an example shown in FIG. 2, the first frequency band used in the first communication system and the second frequency band used in the second communication system are neighboring to each other on a frequency axis. In an example shown in FIG. 3, the first frequency band used in the first communication system shares a portion of the second frequency band used in the second communication system. The frequency band usages shown in FIGS. 1 and 2 are merely examples. Other usage conditions may be realized. In general, the frequency band usages shown in FIGS. 2 and 3 vary depending on time. However, the frequency band usage may be invariant with respect to time.

In the first communication system, an interfered wireless station is performing a wireless communication with a destination. In the second communication system, an interfering wireless station is performing a wireless communication with another destination. At a location of the interfered wireless station, not only radio waves from the first communication system, but also radio waves from the second communication system reach the interfered wireless station. Therefore, the communication performed by the interfering wireless station in the second communication system interferes with the communication performed by the interfered wireless station. Depending on the positional relationship of the wireless stations, the first communication system also interferes with the interfering wireless station in the second communication system. However, for the sake of simplicity of the explanation, it is assumed that the interfered wireless station in the first communication system is interfered, and that the interfering wireless station in the second communication system interferes with the interfered wireless station in the first communication system. As described later, the interfering wireless station performs a countermeasure for reducing the interference in response to a reception of an interference notification signal. Thus, the interference received by the interfered wireless station is reduced. In addition, the interference received by the interfering wireless station is reduced.

2. Interfered Wireless Station

Figure 4:
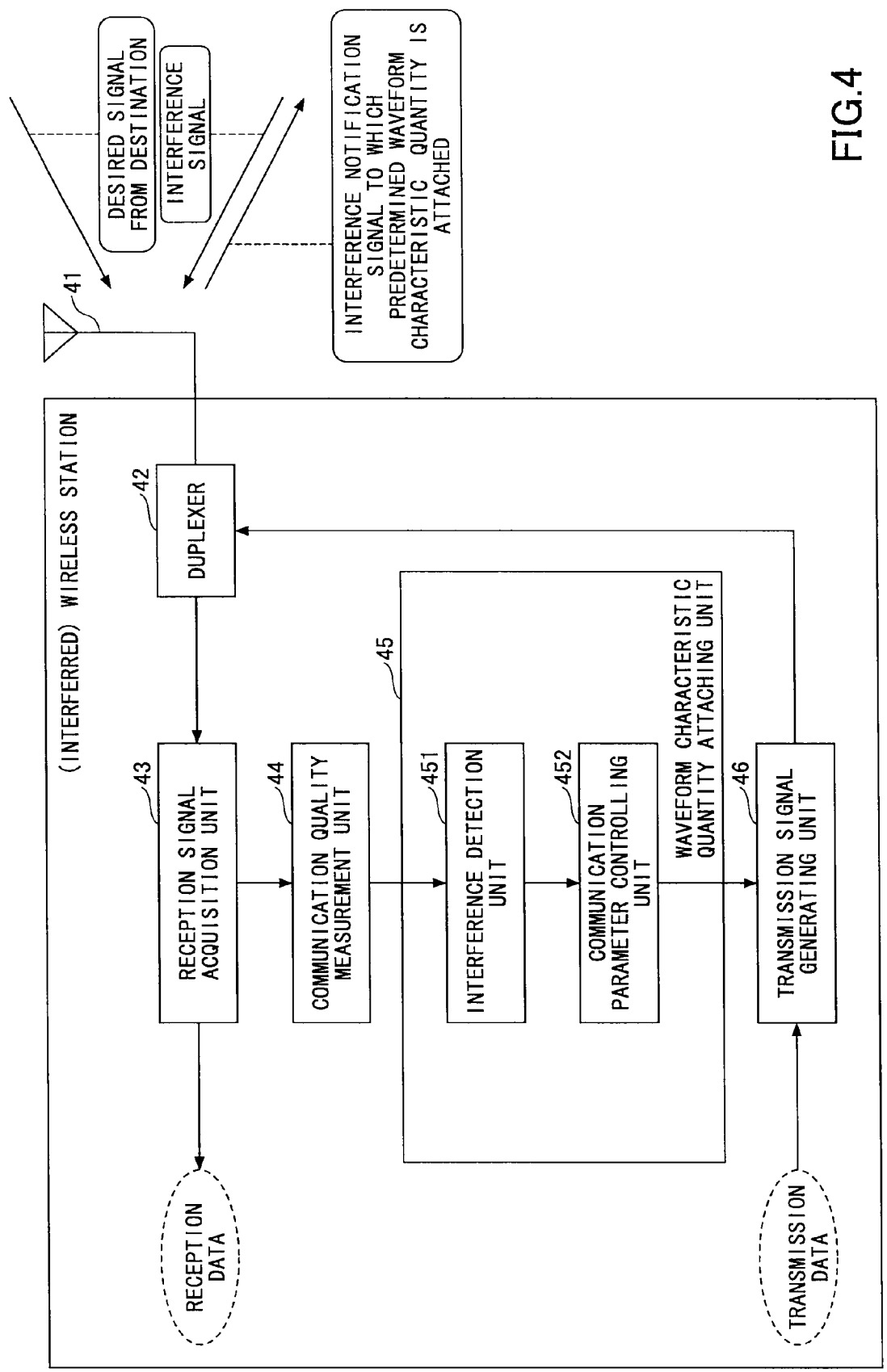
FIG. 4 is a functional block diagram of an interfered wireless station used in the embodiment.

FIG. 4 is a functional block diagram of the interfered wireless station used in the embodiment. The wireless station shown in FIG. 4 can be used as the interfered wireless station or the destination of the communication performed by the interfered wireless station. However, for the sake of the simplicity of the explanation, it is assumed that the wireless station shown in FIG. 4 is the interfered wireless station in FIG. 1. Among various functions included in the interfered wireless station, FIG. 4 shows functions that are particularly related to the embodiment. Specifically, the interfered wireless station includes an antenna 41, a duplexer 42, a reception signal acquisition unit 43, a communication quality measurement unit 44, a waveform characteristic quantity attaching unit 45, and a transmission signal generating unit 46. The waveform characteristic quantity attaching unit 45 includes an interference detection unit 451 and a communication parameter controlling unit 452.

The duplexer 42 properly separates a signal received through the antenna 41 from a signal to be transmitted through the antenna 41. Specifically, the duplexer 42 transmits the signal received through the antenna 41 to the reception signal acquisition unit 43, and the duplexer 42 transmits the signal from the transmission signal generating unit 46 to the antenna 41.

The reception signal acquisition unit 43 acquires signals received from other wireless stations. The received signals include a signal from the destination of the communication and an interference signal from the interfering wireless station. When the wireless station shown in FIG. 4 is the interfered wireless station, the other wireless stations include the destination wireless station of the communication performed by the interfered wireless station, the interfering wireless station, and the destination wireless station of the communication performed by the interfering wireless station. The reception signal acquisition unit 43 restores reception data received from the destination from the received signals, and passes the reception data to a subsequent processing unit not shown in FIG. 4. Further, the reception signal acquisition unit 43 extracts a pilot signal included in the received signals, and passes the pilot signal to the communication quality measurement unit 44.

The communication quality measurement unit 44 measures the quality of the communication based on a reception level of the received pilot signal. Here, the reception level is defined broadly to be a quantity representing whether a wireless communication condition is good or not, regardless of whether the reception level is an instantaneous value or an average value. The reception level may be expressed, for example, by a received power, an electric field intensity RSSI (Received Signal Strength Indicator), a received power of a desired signal RSCP (Received Signal Code Power), a path loss, SNR, SIR, or $Ec/N_0$. For example, the quality of the communication may be expressed in terms of a bit error rate or a block error rate. The bit error rate can be measured, for example, using a cyclic redundancy check (CRC). A difference between use of the term "the reception level" and use of the term "the quality of the communication" is not strict. The reception level and the quality of the communication may be used as synonyms, provided that there is no possibility of confusion.

The waveform characteristic quantity attaching unit 45 determines whether the quality of the communication measured by the communication quality measurement unit 44 is lower than a predetermined value. When the waveform characteristic quantity attaching unit 45 determines that the measured quality of the communication is lower than the predetermined value, the waveform characteristic quantity attaching unit 45 controls communication parameters so that a transmission signal has a predetermined waveform characteristic quantity. Here, the waveform characteristic quantity is information about a statistical characteristic included in a signal waveform. The waveform characteristic quantity may be expressed in terms of a cyclostationarity obtained by a second order cyclic autocorrelation value, a variance of signal amplitudes, or a frequency correlation value.

A waveform of a signal is determined by various parameters, such as a central frequency, a frequency bandwidth, a transmission power, a modulation method, and transmitted symbols. Conversely, the waveform of the signal includes characteristics of the above described communication parameters. Such characteristics are referred to as "the waveform characteristic quantity" or "a characteristic quantity" in this specification. For example, it is possible to detect the presence or absence of a signal using a cyclic autocorrelation function (CAF) of the signal. In this case, the following property is used to detect presence or absence of the signal. Namely, because of, for example, a modulation method used for the signal, a value of the cyclic autocorrelation function (CAF) becomes a large value, only when specific parameters (a cyclic frequency and a lag parameter) are used for the calculation of the cyclic autocorrelation function. Further, as described later, it is possible to attach characteristic quantities corresponding to different cyclostationarities to signals using the same modulation method. However, these are merely examples and the characteristic quantity representing the characteristic of the waveform of the signal can be expressed in terms of various aspects, such as a correlation value of the signal or a statistical value of the signal. In the embodiment, a specific waveform characteristic quantity is defined in advance in the first communication system and the second communication system. An occurrence of the interference is notified to the interfering wireless station through the interference notification signal having the waveform characteristic quantity.

A value of a second order cyclic autocorrelation function (CAF) of a signal x(t) can be calculated with the following formula.

[Expression 1]

$$R_x^\alpha(\tau) = \lim_{I \to \infty} \frac{1}{I} \int_0^I x(t) x^*(t+\tau) e^{-j2\pi\alpha t} dt \quad (1)$$

Here, * represents a complex conjugate, I is an observation time interval, α is a cyclic frequency, and τ is a lag parameter.

Regarding the CAF, in general, x(t) has a cyclostationarity, if $R_x^\alpha(\tau) \neq 0$ for an $\alpha \neq 0$.

Further, a discrete time representation of the formula (1) is as follows.

$$R_x^\alpha[v] = \frac{1}{I_0} \sum_{i=0}^{I_0-1} x[i] x^*[i+v] e^{-j2\pi\alpha i T_s} \quad \text{[Expression 2]}$$

Here, $I_0$ is the number of observed samples, v is a discrete time representation of the lag parameter. Incidentally, $x[i] \equiv x(iT_S)$ and $T_S$ is a sampling period.

The interference detection unit 451 of the waveform characteristic quantity attaching unit 45 detects presence or absence of the interference by determining whether the quality of the communication measured by the communication quality measurement unit 44 is lower than the predetermined value. When interference is detected, the communication parameter controlling unit 452 is notified of the presence of the interference.

The communication parameter controlling unit 452 controls the communication parameters depending on whether the interference is detected in the interference detection unit 451. When the interference is detected, the communication parameters are changed so that the transmission signal generating unit 46 generates a transmission signal (interference notification signal) having the predetermined waveform characteristic quantity. When the interference detection unit 451 does not detect any interference which causes the quality of the communication to be greater than the predetermined value, the communication parameter controlling unit 452 does not apply the communication parameters that induce the predetermined waveform characteristic quantity to a transmission signal. When the predetermined waveform characteristic quantity is expressed in terms of the second order cyclic autocorrelation function (CAF), the communication parameters are changed so that the cyclic autocorrelation function (CAF) of the transmission signal has a peak value when the cyclic frequency is a predetermined cyclic frequency and the lag parameter is a predetermined lag parameter. When the transmission signal is an orthogonal frequency division multiplexing (OFDM) signal, specific examples of the communication parameters to be changed include (1) parameters that indicate particular subcarriers among plural subcarriers, the particular subcarriers transmitting identical signals, (2) parameters that indicate particular subcarriers to which phase rotations are applied, (3) parameters that indicate time shifts to be applied to particular subcarriers, and (4) parameters that indicate shifts and cyclic shifts to be applied to particular subcarriers. The above parameters are merely examples of the communication parameters. A transmission signal having a desired waveform characteristic quantity (interference notification signal) may be realized by using communication parameters indicating other items. Methods of generating a transmission signal having a desired waveform characteristic quantity is explained in "5. Specific methods for attaching waveform characteristic quantity."

Figure 5:
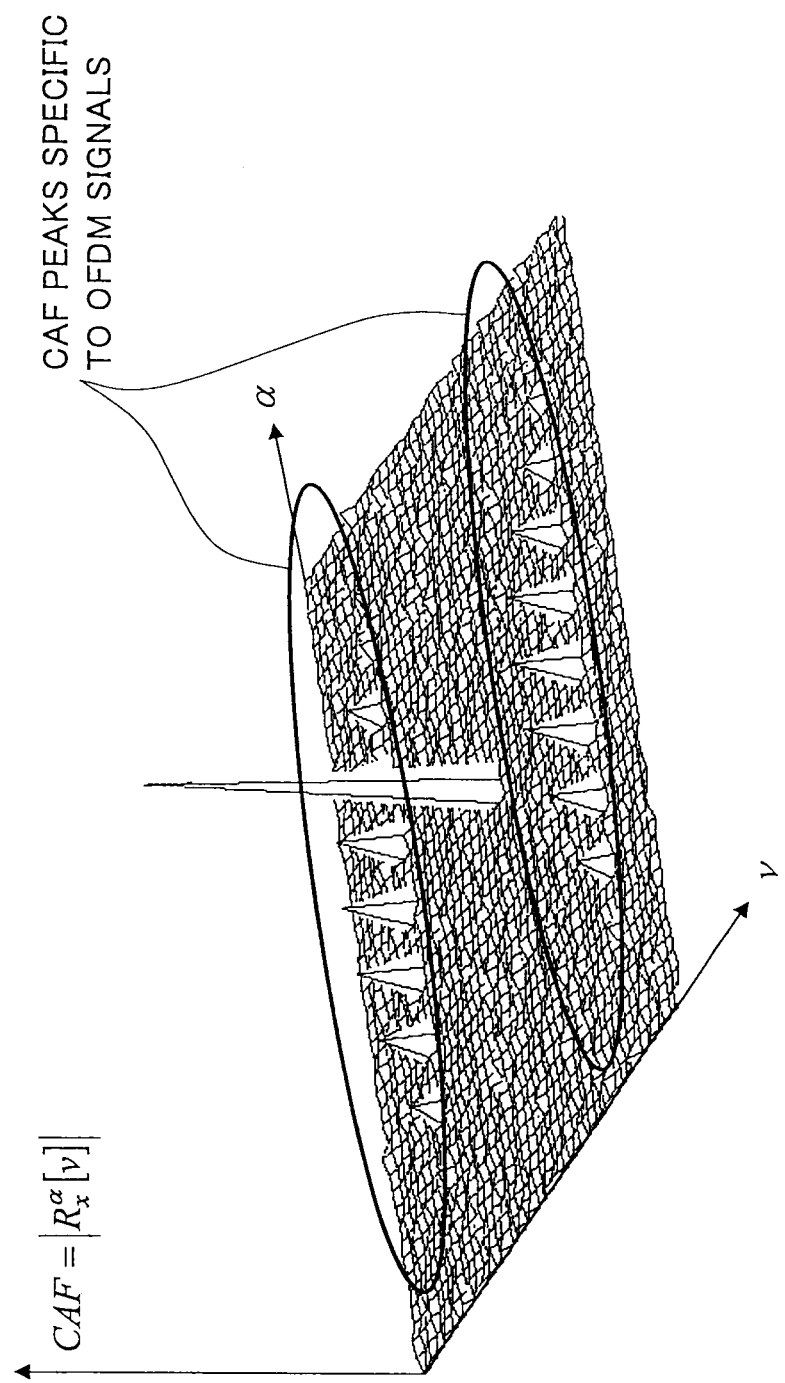
FIG. 5 is a diagram showing a calculation example of a cyclic autocorrelation function (CAF) with respect to an OFDM signal.
Figure 6:
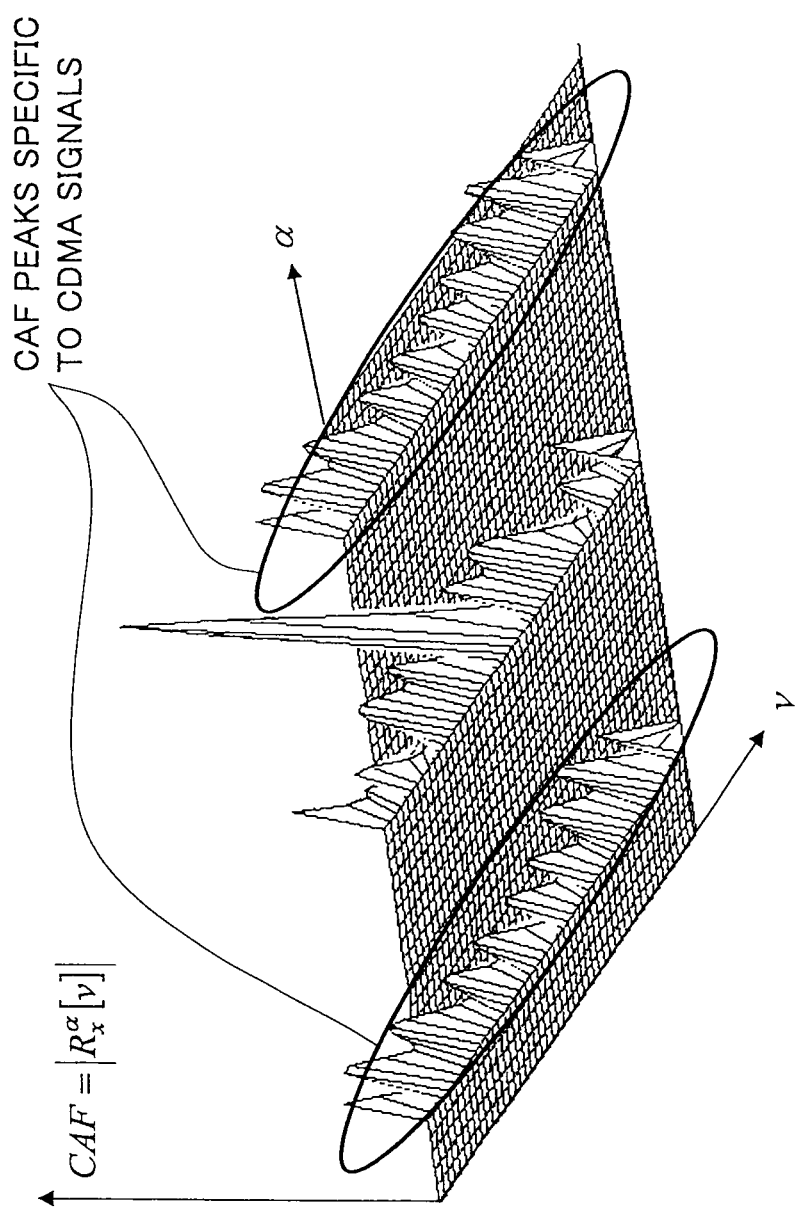
FIG. 6 is a diagram showing a calculation example of a cyclic autocorrelation function (CAF) with respect to a CDMA signal.
Figure 7:
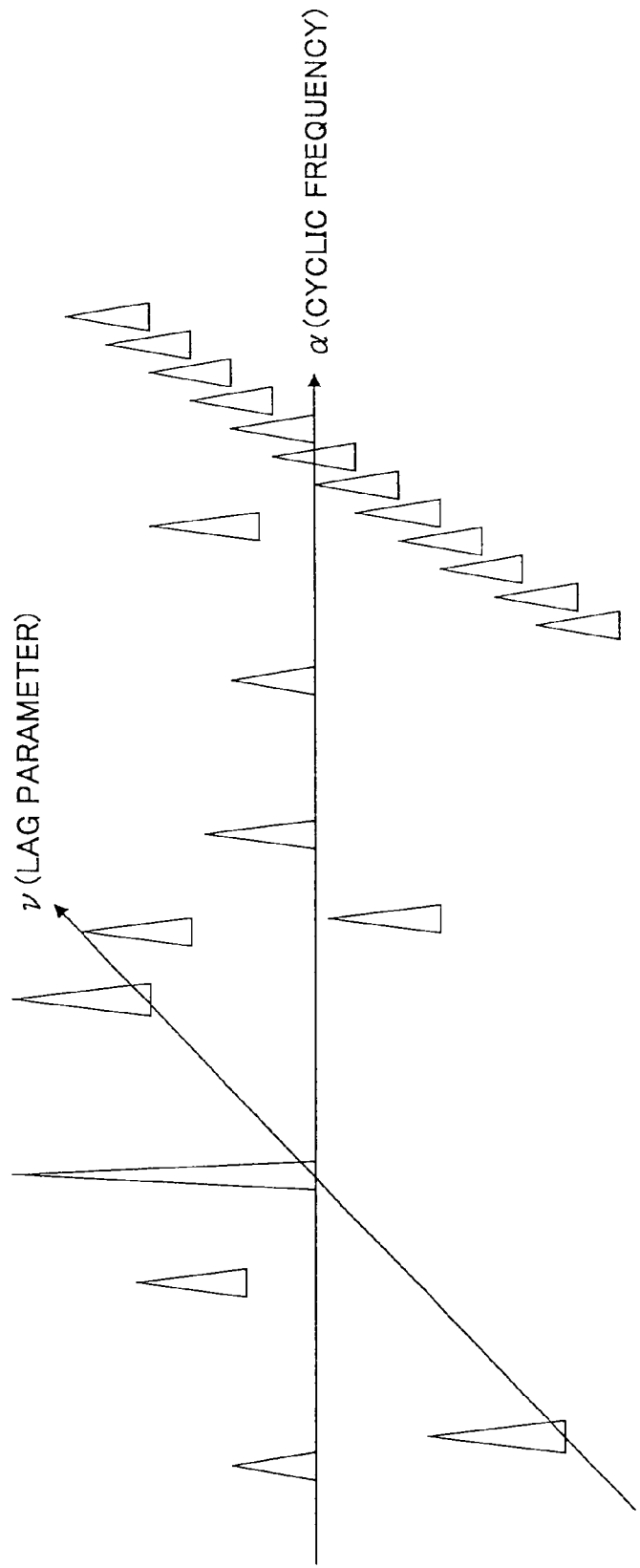
FIG. 7 is a diagram schematically showing that peaks can be obtained at various combinations of parameters ($\alpha$, $\nu$)

As described above, parameters which may be necessary for calculating the second order autocorrelation function (CAF) are the cyclic frequency α and the lag parameter v. Therefore, when the predetermined waveform characteristic quantity is expressed in terms of the second order cyclic autocorrelation function (CAF), a peak position of the second order cyclic autocorrelation function (CAF) is defined, in general, by a combination of a cyclic frequency and a lag parameter (α, v). FIG. 5 shows an example in which values of a cyclic autocorrelation function (CAF) for an OFDM signal are calculated for various combinations of cyclic frequencies αs and lag parameters vs. FIG. 6 shows an example in which values of a cyclic autocorrelation function (CAF) for a CDMA signal are calculated for various combinations of cyclic frequencies αs and lag parameters vs. As indicated in the figures, a combination of parameters (α, v) which induces a relatively higher peak depends on a signal. In other words, predetermined communication parameters are determined in advance, so that predetermined combinations of the parameters (α, v) induce higher peaks. A receiving side can determine whether an interference notification signal to which a predetermined waveform characteristic quantity is attached is received or not by analyzing combinations of the parameters which induce peaks. The number of the peaks, which are used for the determination, may be one or more than one. FIGS. 5 and 6 show merely examples of the calculations of the second order cyclic autocorrelation functions (CAFs). Another second order cyclic autocorrelation function (CAF) which has peaks at different points may be used. More generally, as shown in FIG. 7, an interference notification signal whose cyclic autocorrelation function (CAF) has peaks at arbitrary combinations (α, v) of cyclic frequencies α and a lag parameteres v can be realized. The cyclic frequency represents a shift amount in a direction of the frequency axis, and the lag parameter corresponds to a shift amount in a direction of a time axis. This point is explained later.

The transmission signal generating unit 46 of FIG. 4 generates a transmission signal in accordance with the communication parameters controlled by the communication parameter controlling unit 452. The transmission signal (interference notification signal) having the predetermined waveform characteristic quantity is a signal for notifying the interfering wireless station of the occurrence of the interference. Namely, the waveform characteristic quantity for the interference notification signal is secured in advance so as to notify a wireless station in a different communication system of an occurrence of interference. The interference notification signal to be transmitted by the interfered wireless station may be a dedicated signal for notifying of the interference that is transmitted so as to be received by the interfering wireless station and the destination wireless station with which the interfering wireless station is communicating. The interference notification signal may be a signal including information to be transmitted to the destination wireless station with which the interfered wireless station is communicating, in addition to such interference notification information. For example, when the signal is an OFDM signal, the waveform characteristic quantity for notifying of the interference may be realized by using a portion of subcarriers, and data for the destination of the communication may be transmitted by using the remaining subcarriers. As described later, when the interfering wireless station receives the interference notification signal, the interfering wireless station performs a countermeasure to avoid the interference.

3. Interfering Wireless Station

Figure 8:
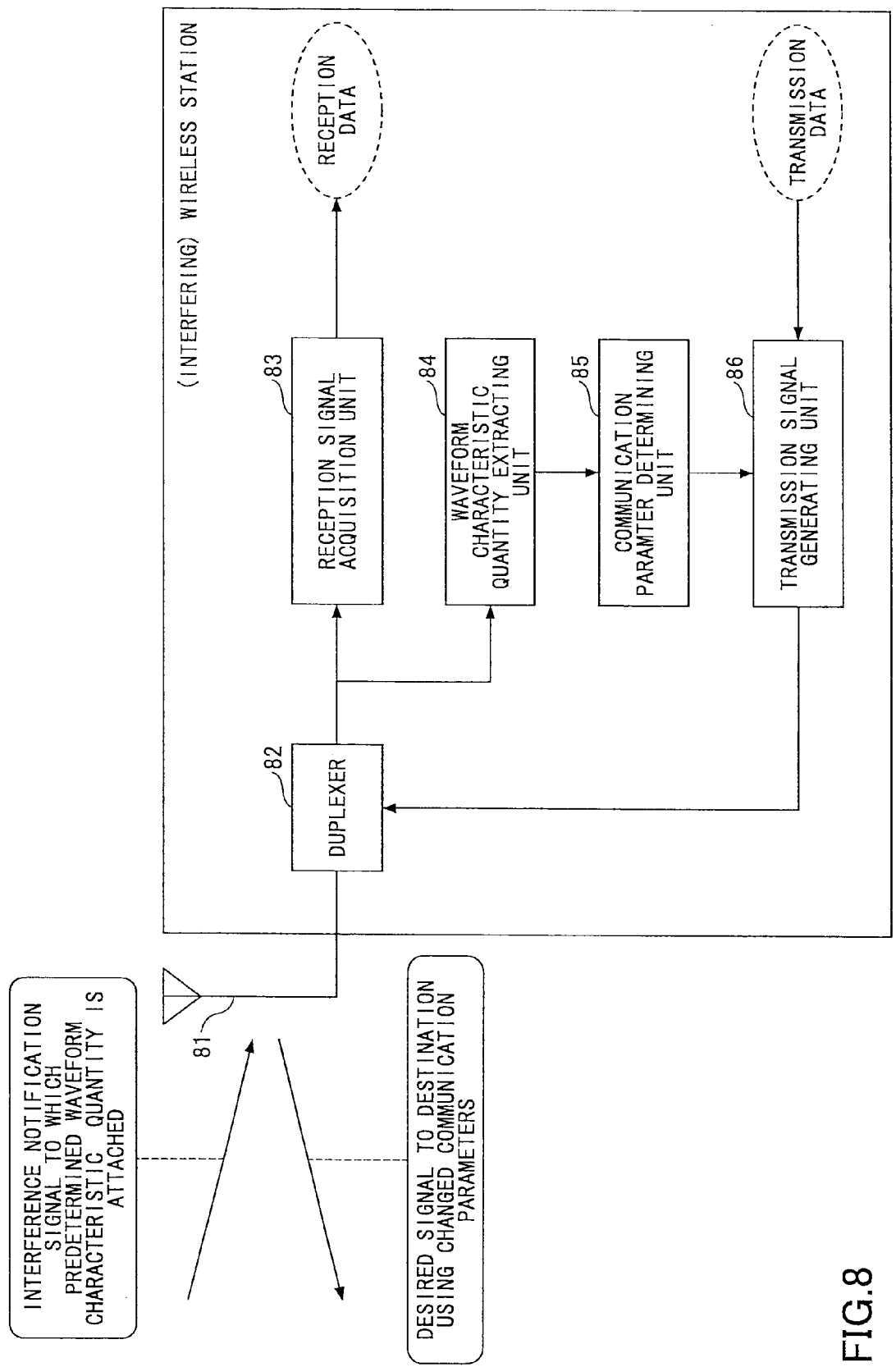
FIG. 8 is a functional block diagram of an interfering wireless station used in the embodiment.

FIG. 8 is a functional block diagram of a wireless station used in the embodiment. The wireless station shown in FIG. 8 can be used as the interfering wireless station in FIG. 1 or the destination wireless station with which the interfering wireless station communicates in FIG. 1. However, it is assumed that the wireless station shown in FIG. 8 is the interfering wireless station in FIG. 1. Among various functions included in the interfering wireless station, functions which are particularly related to the embodiment are shown in FIG. 8. Specifically, the interfering wireless station includes an antenna 81, a duplexer 82, a reception signal acquisition unit 83, a waveform characteristic quantity extracting unit 84, a communication parameter controlling unit 85, and a transmission signal generating unit 86.

The duplexer 82 properly separates a signal received through the antenna 81 from a signal to be transmitted through the antenna 81. Specifically, the duplexer 82 transmits the signal received through the antenna 81 to the reception signal acquisition unit 83 or the waveform characteristic quantity extracting unit 84, and the duplexer 82 transmits the signal from the transmission signal generating unit 86 to the antenna 81.

The reception signal acquisition unit 83 obtains signals received from other wireless stations. When the wireless station shown in FIG. 8 is the interfering wireless station, the received signals include signals from the destination wireless station with which the interfering wireless station communicates, interfering signals from the interfered wireless station, and interfering signals from the destination wireless station with which the interfered wireless station communicates. The reception signal acquisition unit 83 restores the data received from the destination with which the interfering wireless station communicates from the received data, and passes the restored data to a subsequent processing unit not shown in FIG. 8.

The waveform characteristic quantity extracting unit 84 extracts a waveform characteristic quantity from the signal received through the antenna 81 and the duplexer 82. As described above, the waveform characteristic quantity is the information about the statistical characteristic included in the signal waveform. As the waveform characteristic quantity, for example, a cyclostationality obtained by a second order cyclic autocorrelation function (CAF), a variance of signal amplitudes, or a frequency correlation value can be used. In the embodiment, presence or absence of a predetermined waveform characteristic quantity is determined in the first communication system and the second communication system. The predetermined waveform characteristic quantity is used for determining whether an interference notification signal is received or not. For example, when the predetermined waveform characteristic quantity is expressed in terms of a second order cyclic autocorrelation function (CAF) of an OFDM signal, it is determined whether the interference notification signal is received by analyzing whether relatively higher peaks appear at positions shown in FIG. 5.

When the interfering wireless station transmits or receives signals, the communication parameter controlling unit 85 of FIG. 8 controls communication parameters based on an analyzing result of the waveform characteristic quantity extracting unit 84. As described above, the interference notification signal is for notifying the interfering wireless station of the occurrence of the interference in the interfered wireless station. Therefore, it is possible that the wireless station which receives the interference notification signal is the interfering wireless station itself or the destination wireless station with which the interfering wireless station communicates. When it is determined that the interfering wireless station has received the interference notification signal, the communication parameter controlling unit 85 changes the communication parameters used for the communication with the destination. The communication parameters include, for example, frequency resources, time slots, transmission powers, and weights for controlling beams (weighting factors). However, the communication parameters are not limited to the examples. The communication parameters are changed so as to reduce the interference to be caused by the signal to be transmitted using the changed communication parameters. Therefore, the changed communication parameters result in, for example, performing a communication using resources which are different from the resources which were used prior to the change, transmitting signals with transmission powers which are smaller than the transmission powers which were used prior to the change, and performing communication using a beam having a directionality which is different from the directionality of a beam which was used prior to the change.

The transmission signal generating unit 86 generates a signal to be transmitted to the destination wireless station in accordance with the communication parameters controlled by the communication parameter controlling unit 85.

4. Operation Example

Figure 9:
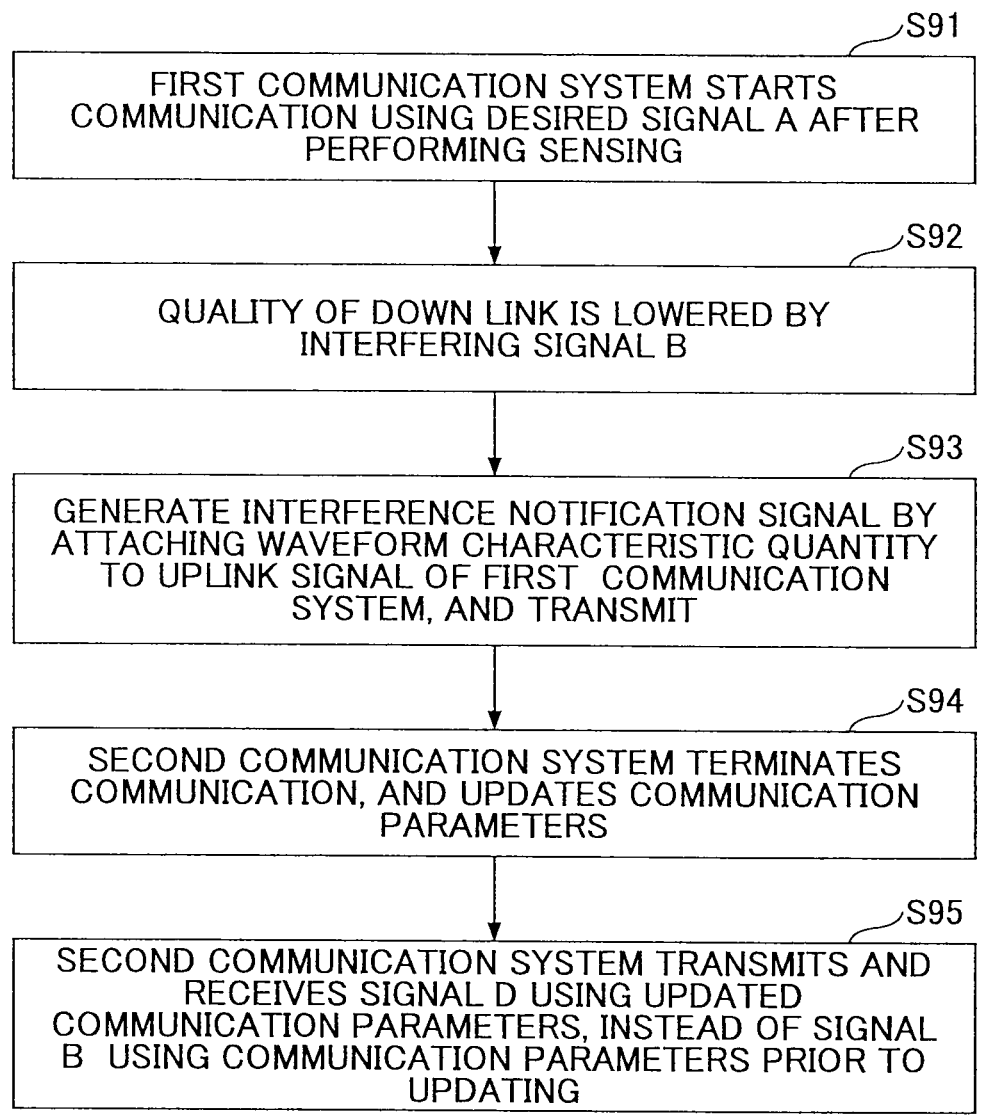
FIG. 9 is a diagram showing a method used by the interfered wireless station and the interfering wireless station in the condition shown in FIG. 1.
Figure 10:
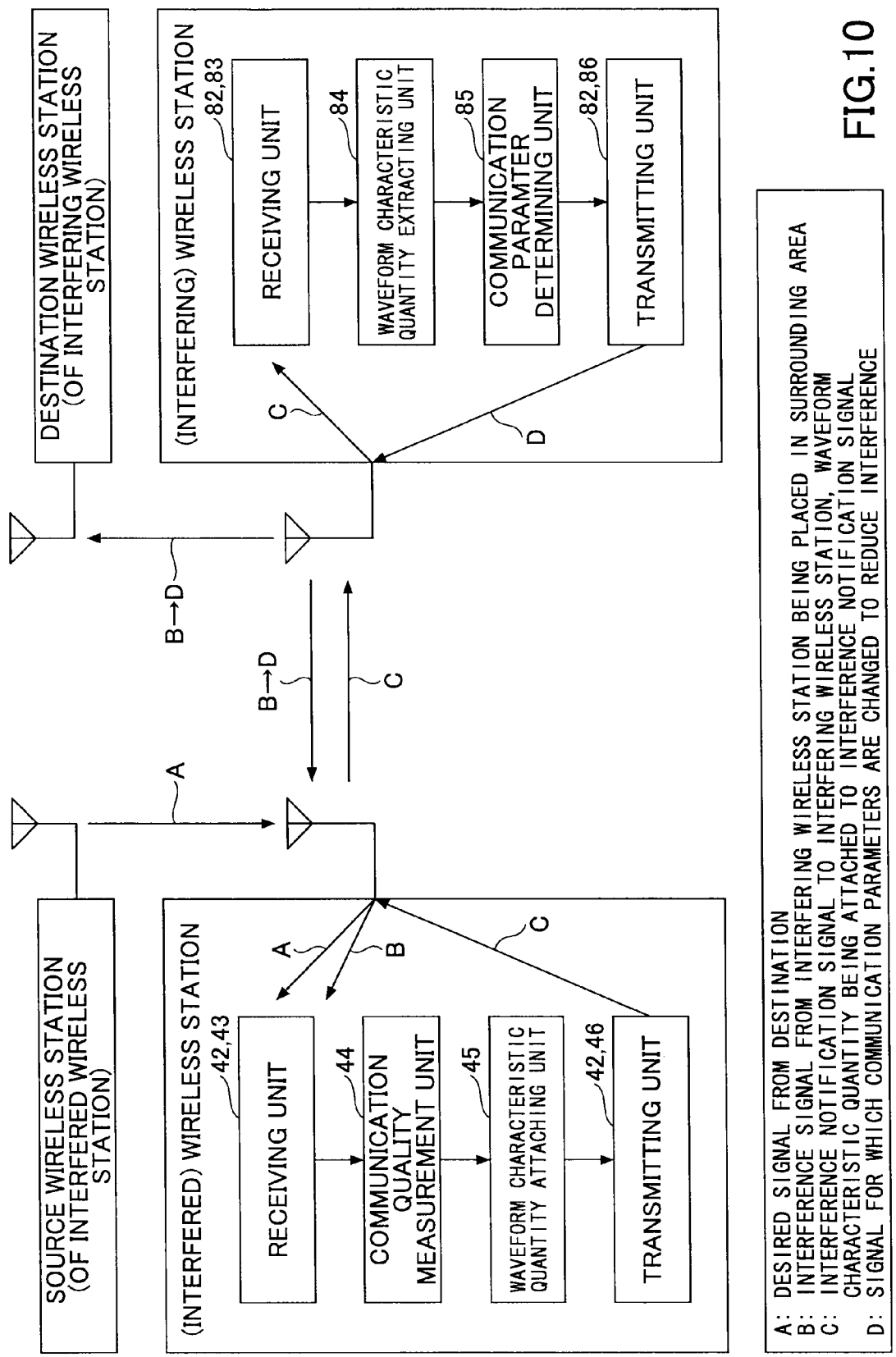
FIG. 10 is a diagram showing wireless stations used in the operation example shown in FIG. 9.

FIG. 9 shows a method used by the interfered wireless station and the interfering wireless station in the condition shown in FIG. 1. FIG. 10 is a diagram showing the condition shown in FIG. 1 from a viewpoint of the interfered wireless station and a viewpoint of the interfering wireless station. Hereinafter, an operation example in the embodiment is explained while referring to FIGS. 9 and 10.

At step S91 in FIG. 9, in order to perform a communication with the destination, the interfered wireless station performs monitoring or sensing of a radio wave condition of a surrounding area in the first communication system. The interfered wireless station starts a communication using a desired signal A in the first communication system, in response to that, the interfered wireless station does not detect any significant signal. For detecting presence or absence of a significant signal, for example, a signal detection method based on electrical power, such as the carrier sense multiple access with collision avoidance method (CSMA/CA), may be used. Alternatively, the interfered wireless station may determine whether it is possible to start a communication by analyzing a waveform characteristic quantity of a signal input to the antenna of the interfered wireless station.

At step S92, in the interfered wireless station, the quality of a downlink is lowered by an effect for a received interfering signal B from the interfering wireless station or from the destination with which the interfering wireless station communicates in the second communication system.

At step S93, the interfered wireless station generates an uplink signal C (the interference notification signal) to which the predetermined waveform characteristic quantity is attached, and transmits the uplink signal C. As described above, the interference notification signal may be the dedicated signal for the notification of the interference that is transmitted so as to be received by the interfering wireless station. Alternatively, the interference notification signal may be the signal including the information to be transmitted to the destination, with which the interfered wireless station communicates, in addition to such interference notification information.

At step S94, in response to the reception of the interference notification signal C, the interfering wireless station in the second communication system terminates the communication performed by the interfering wireless station itself, and determines other communication parameters, with which the interference can be avoided. The interfering wireless station can determine whether the interference notification signal is received or not by determining whether the waveform characteristic quantity of the signal input to the antenna is the predetermined waveform characteristic quantity or not. For example, it is possible to determine whether the interference notification signal is received or nor by determining whether the cyclic autocorrelation function (CAF) of the signal input to the antenna has peaks at predetermined combinations of parameters ($\alpha$, $\nu$) or not. The number of the peaks to be used for the determination may be one or more than one.

At step S95, the interfering wireless station restarts the communication with the destination using a signal D which is based on the changed communication parameters. The signal D based on the changed communication parameters is a signal which does not interfere with the communication of the interfered wireless station. Such a signal is transmitted using, for example, at least one of resources (a frequency resource or a time resource) which are different from a resource which was used prior to the change, a transmission power which is different from a transmission power which was used prior to the change, and a directional beam which is different from the directional beam which was used prior to the change.

Figure 3:
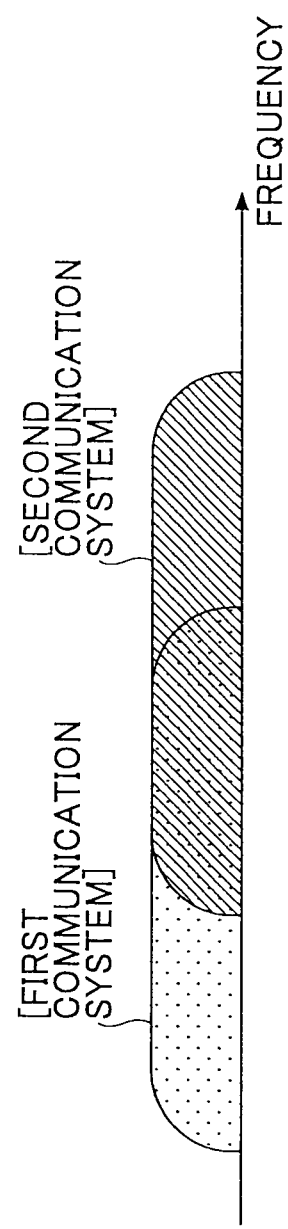
FIG. 3 is a diagram showing another example of frequency band usages.

As described above, according to the embodiment, the interference notification signal to which the predetermined waveform characteristic quantity is attached is transmitted from the interfered wireless station to the interfering wireless station. Thus the interfering wireless station can perform the countermeasure to reduce the interference. For the analysis of the waveform characteristic quantity, background information of the communication systems may not be required. The analysis can be performed, provided that the combinations of the parameters ($\alpha$, $\nu$) at which the peaks appear are known. Therefore, the embodiment, in which the interference notification signal having the specific waveform characteristic quantity is transmitted from the interfered wireless station to the interfering wireless station, is especially useful for avoiding interference among different communication systems. Further, the interference reducing method according to the embodiment can be used without depending on information about frequency bands used in plural communication systems. For example, the interference reducing method according to the embodiment can be used not only for the case in which the frequency band usages are as shown in FIG. 3, but also for the case in which the frequency band usages are as shown in FIG. 2. When the frequency band usages are as shown in FIG. 2, the frequency band used for the communication system 1 is different from the frequency band used for the communication system 2. Therefore, theoretically, the communication systems do not interfere with each other. However, for example, when a transmission power in one of the communication systems is high, it is possible that the one of the communication systems interferes with the other communication system. Even for such a case, the interference reducing method according to the embodiment can effectively reduce the interference.

5. Specific Methods for Attaching Waveform Characteristic Quantity

As described above, various types of quantities can be used as the waveform characteristic quantities. Further, when the values of the second order cyclic autocorrelation function (CAF) are used as the waveform characteristic quantities, the communication parameters for the transmission signal can be set so that peaks appear at various combinations of the parameters ($\alpha$, $\nu$). Hereinafter, specific methods for causing peaks of the second order cyclic autocorrelation function (CAF) to appear at desired combinations of the parameters ($\alpha$, $\nu$) are explained. The methods explained below are merely examples. The positions of the peaks may be changed by another method. In the following examples, cases in which a waveform characteristic quantity is attached to an OFDM signal are explained. However, it is possible to attach an arbitrary waveform characteristic quantity to a signal other than the OFDM signal, such as a CDMA signal.

<<5.1 Transmission of Identical Signals by Plural Subcarriers>>

Figure 11:
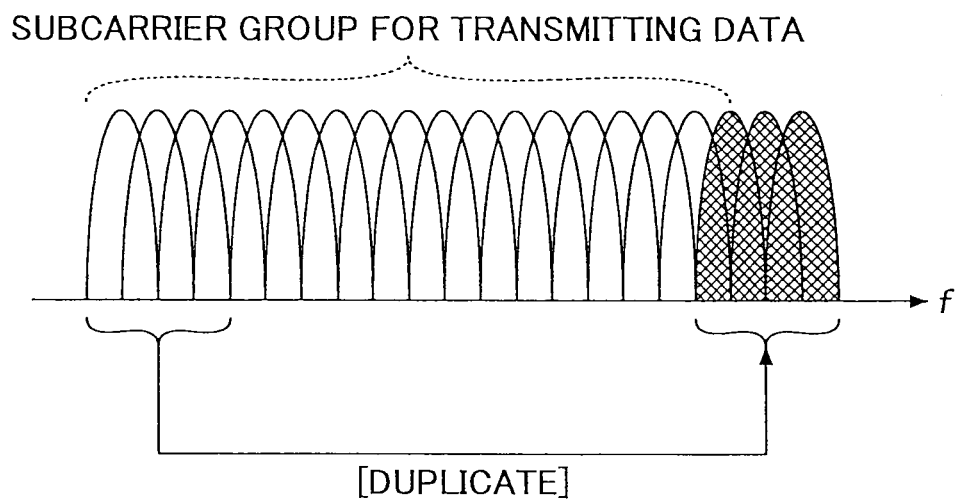
FIG. 11 is a diagram showing a specific example in which plural subcarriers transmit identical signals.

FIG. 11 shows plural subcarriers included in one symbol. In the example shown in FIG. 11, the plural subcarriers are arranged in line in a frequency axis direction. A first subcarrier from the left and a third subcarrier from the right transmit first identical signals. A second subcarrier from the left and a second subcarrier from the right transmit second identical signals. A third subcarrier from the left and a first subcarrier from the right transmit third identical signals. In the example shown in FIG. 11, signals to be transmitted by a predetermined number of subcarriers at a lower frequency side are duplicated and the duplicated signals are to be transmitted by corresponding number of subcarriers at a higher frequency side. Here, the predetermined number of subcarriers at the lower frequency side and the corresponding number of subcarriers at the higher frequency side are separated by a predetermined frequency interval. In this case, a correlation between an OFDM symbol corresponding to the subcarriers shown in FIG. 11 and an OFDM symbol corresponding to subcarriers which are equivalent to the subcarriers shown in FIG. 11 but shifted by the predetermined frequency interval in the frequency axis direction indicates a high correlation value. As described above, by sending identical signals using plural subcarriers, positions at which peaks of the cyclic autocorrelation function (CAF) appear can be controlled in the frequency axis direction. In the example shown in FIG. 11, when the cyclic frequency is equal to the value of the predetermined frequency interval, by which the subcarriers sending the identical signals are separated, a high correlation value (a peak) is obtained. Here, signals to be transmitted by subcarriers at the higher frequency side may be duplicated, and the duplicated signals may be transmitted by subcarriers at the lower frequency side.

Figure 12:
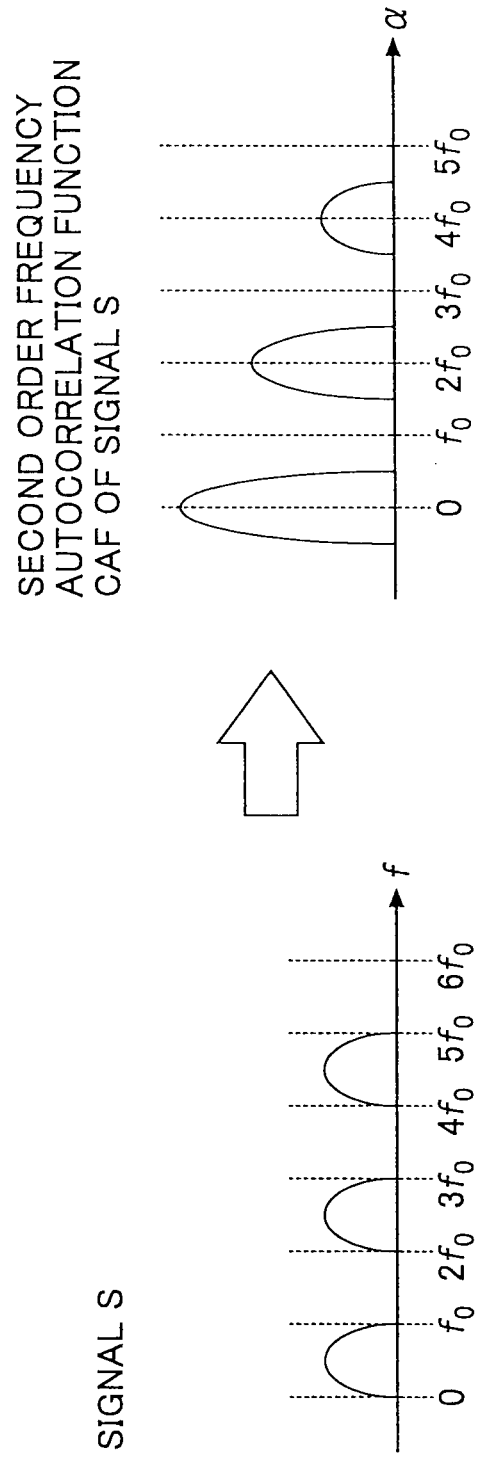
FIG. 12 is a diagram showing another specific example in which plural subcarriers transmit identical signals.

FIG. 12 shows another example in which plural subcarriers transmit identical signals. Here, it is assumed that a signal S includes subcarriers which are evenly spaced apart by a frequency interval $f_0$ on the frequency axis. A right-hand side of FIG. 12 shows a graph of the second order cyclic autocorrelation function (CAF) of the signal S. Namely, relatively higher peaks of the second order cyclic autocorrelation function (CAF) of the signal S are obtained when the signal S is not shifted in the direction of the frequency axis ($\alpha=0$), when the signal S is shifted by $2f_0$ ($\alpha=2f_0$), and when the signal S is shifted by $4f_0$ ($\alpha=4f_0$).

Figure 13:
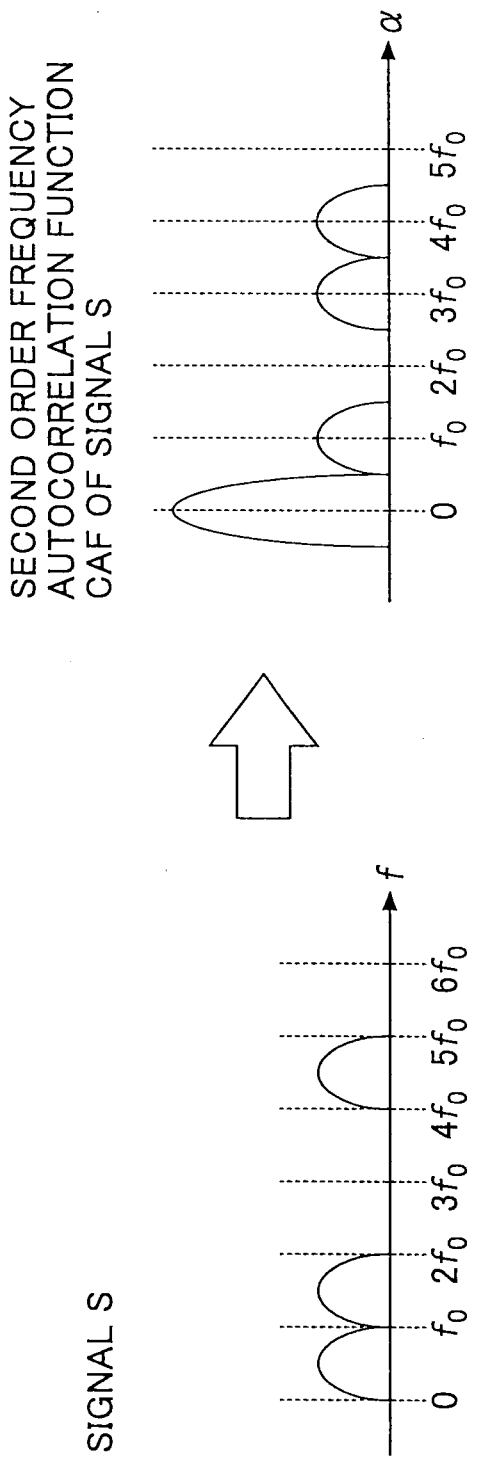
FIG. 13 is a diagram showing another specific example in which plural subcarriers transmit identical signals.

FIG. 13 shows another example in which plural subcarriers transmit identical signals. As shown in FIG. 13, on the frequency axis, a signal S includes a first subcarrier located between 0 and $f_0$, a second subcarrier located between $f_0$ and $2f_0$, and a third subcarrier located between $4f_0$ and $5f_0$. The right-hand side of FIG. 13 shows a graph of the second order cyclic autocorrelation function (CAF) of the signal S. Namely, relatively higher peaks of the second order cyclic autocorrelation function (CAF) of the signal S are obtained when the signal S is not shifted in the direction of the frequency axis ($\alpha=0$), when the signal S is shifted by $f_0$ ($\alpha=f_0$), when the signal S is shifted by $3f_0$ ($\alpha=3f_0$), and when the signal S is shifted by $4f_0$ ($\alpha=4f_0$).

Figure 14:
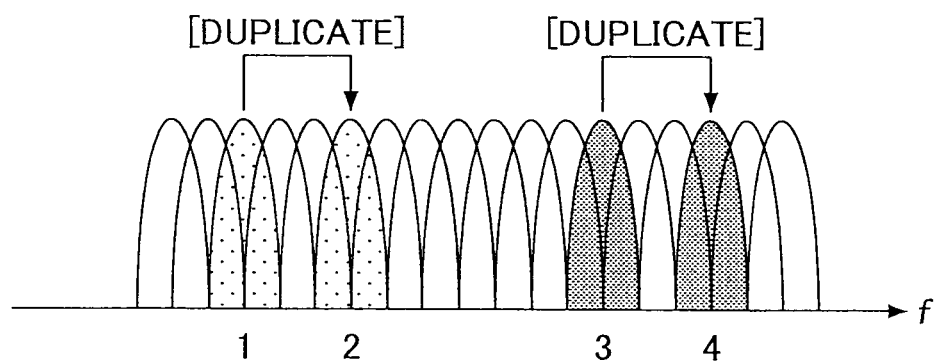
FIG. 14 is a diagram showing a specific example for realizing a cyclostationality using pilot signals.

FIG. 14 shows another example in which plural subcarriers transmit identical signals. In general, one OFDM symbol includes pilot signals and data signals. When identical signals are used for the pilot signals, it is possible to add a cyclostationality to the OFDM symbol by properly mapping the pilot signals. In the example, as shown in FIG. 14, the pilot signals are mapped onto four subcarriers on the frequency axis. Here, the pilot signals mapped onto the subcarriers located at the first position and the second position are identical, and the pilot signals mapped onto the subcarriers located at the third position and the fourth position are identical. In this case, a peak value of the second order cyclic autocorrelation function (CAF) of the OFDM symbol is obtained at a cyclic frequency corresponding to the value of the frequency interval between the first position and the second position (or the value of the frequency interval between the third position and the fourth position).

Figure 15:
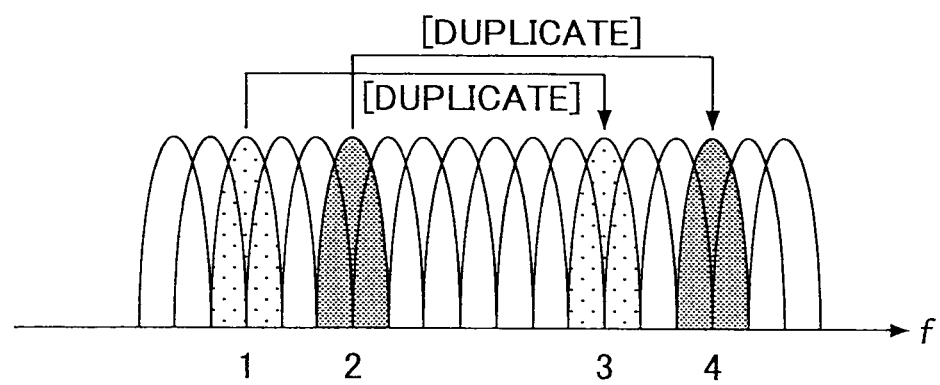
FIG. 15 is a diagram showing a specific example for realizing a cyclostationality using pilot signals.

FIG. 15 shows another example in which plural subcarriers transmit identical signals, similarly to FIG. 14. However, in the example shown in FIG. 15, the pilot signals mapped onto the subcarriers at the first position and the third position are identical, and the pilot signals mapped onto the subcarriers at the second position and the fourth position are identical. In this case, a peak value of the second order cyclic autocorrelation function (CAF) of the OFDM symbol is obtained at a cyclic frequency corresponding to the value of the frequency interval between the first position and the third position (or the value of the frequency interval between the second position and the fourth position).

Figure 16:
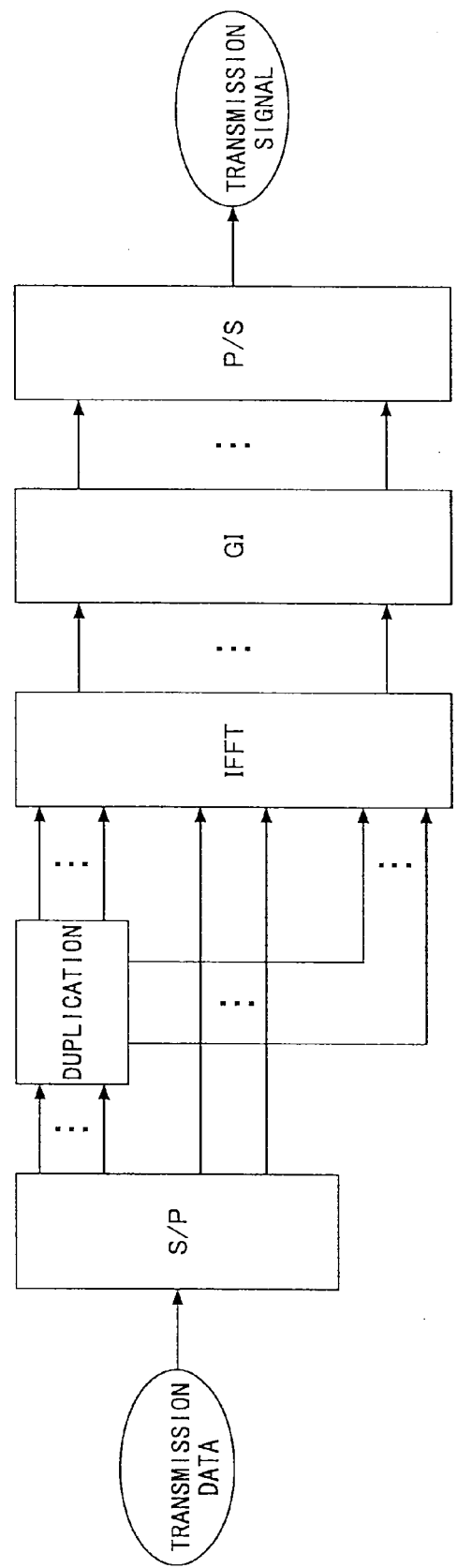
FIG. 16 is a functional block diagram of a transmitting side when plural subcarriers transmit identical signals.

When plural subcarriers transmit identical signals, as shown in FIGS. 11-15, a desired waveform characteristic quantity can be attached to a signal by using, for example, a configuration shown in FIG. 16 at the transmission side. Such a configuration is included, at least, in the combination of the waveform characteristic quantity attaching unit 45 and the transmission signal generating unit 46 of the interfered wireless station. In FIG. 16, "TRANSMISSION DATA" is transmission data to which processes, such as a data modulation process, a channel encoding process, and an interleaving process, have been applied. The transmission data is converted into parallel signals by a serial-parallel conversion unit (S/P). A portion of the parallel signal is duplicated and input to an inverse fast Fourier transform unit (IFFT), and the remaining portion is not duplicated and input to the inverse fast Fourier transform unit (IFFT). A guard interval is inserted into the signal, to which the inverse fast Fourier transform has been applied by the inverse fast Fourier transform unit (IFFT). Then the signal is converted into a serial signal by a parallel-serial conversion unit (P/S), and a transmission signal is output. Here, the receiving side can be realized by a configuration with which the waveform characteristic quantity can be analyzed, such as the configuration shown in FIG. 8.

<<5.2 Application of Phase Rotations to Subcarriers>>

Figure 17:
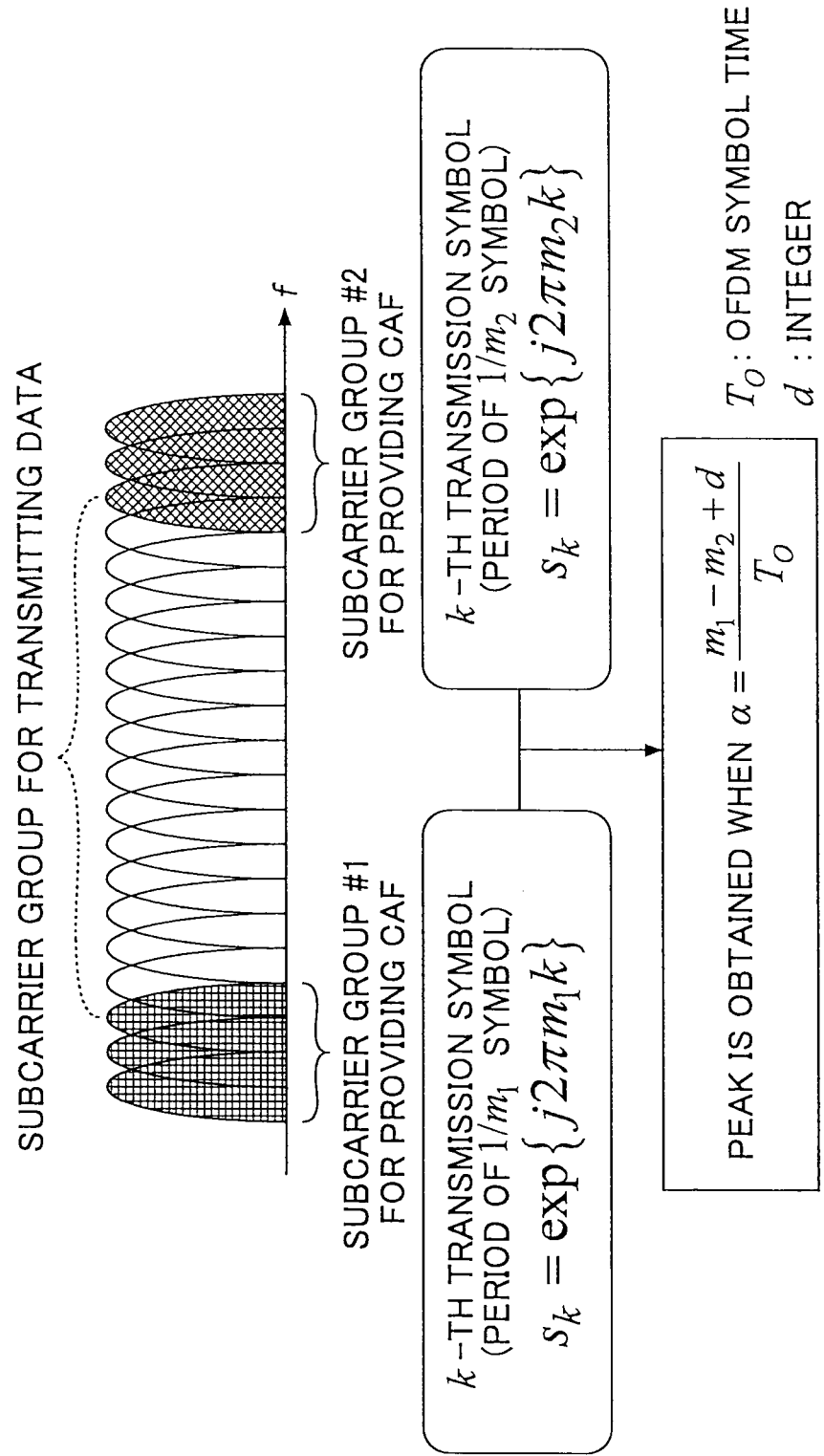
FIG. 17 is a diagram schematically showing a method for realizing a cyclostationality in which phase rotations are applied to corresponding plural subcarriers.

FIG. 17 is a diagram schematically showing a method of realizing a cyclostationality by applying phase rotations, which are obtained by digitizing a sine wave, to plural subcarriers. A factor $S_k$ to be multiplied to a k-th signal (symbol) belonging to a first subcarrier group for providing CAF (SC group #1 for providing CAF) in FIG. 17 is expressed by $s_k = \exp(j2\pi m_1 k)$. Namely, a sine wave having a period of $(1/m_1)$ symbol is digitized, and the values of the digitized sine wave are the factors to be applied to the SC group #1 for providing CAF. Similarly, a factor $s_k$ to be multiplied to a k-th signal (symbol) belonging to a second subcarrier group for providing CAF (SC group #2 for providing CAF) is expressed by $s_k = \exp(j2\pi m_2 k)$. Namely, a sine wave having a period of $(1/m_2)$ symbol is digitized, and the values of the digitized sine wave are the factors to be applied to the SC group #2 for providing CAF. When the phase factors are applied to the corresponding subcarriers as described above, a peak of the second order cyclic autocorrelation function (CAF) is obtained, if the cyclic frequency $\alpha$ is equal to $(m_1 - m_2 + d)/T_0$. Here, $T_0$ is the OFDM symbol time, and d is an integer.

Figure 18:
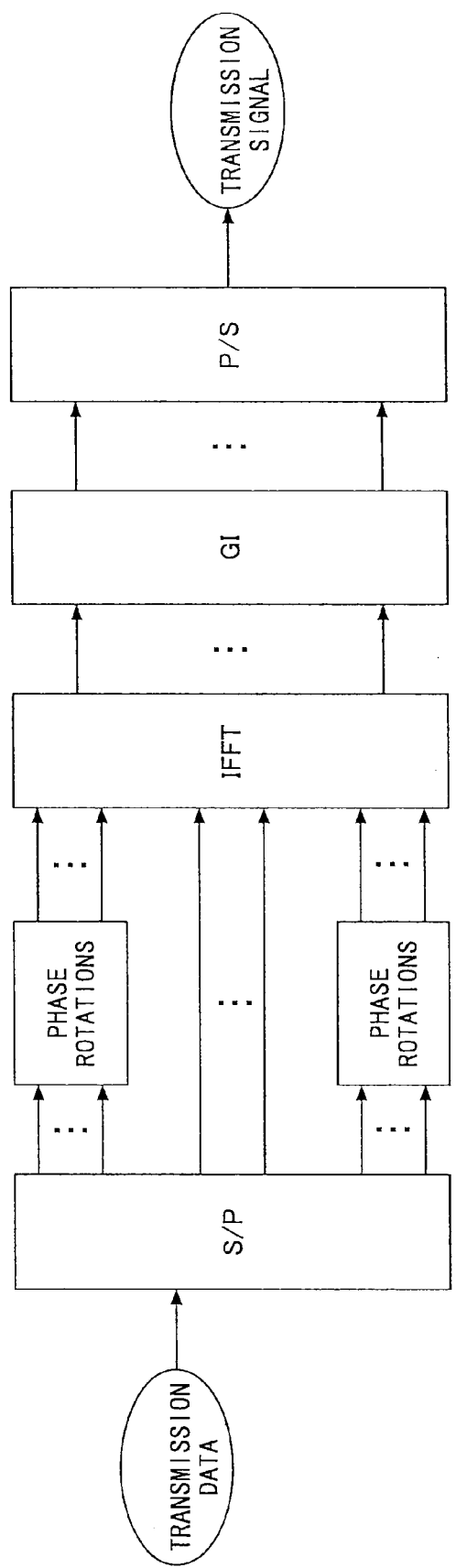
FIG. 18 is a functional block diagram of a transmitting side when the phase rotations are applied to the corresponding plural subcarriers.

When the plural subcarriers transmit the signals as shown in FIG. 17, a desired waveform characteristic quantity can be attached to a signal by using, for example, a configuration shown in FIG. 18 at the transmission side. Such a configuration is included, at least, in the combination of the waveform characteristic quantity attaching unit 45 and the transmission signal generating unit 46 of the interfered wireless station. In FIG. 18, "TRANSMISSION DATA" is transmission data to which processes, such as a data modulation process, a channel encoding process, and an interleaving process, have been applied. The transmission data is converted into a parallel signal by a serial-parallel conversion unit (S/P). The phase rotations are applied to a portion of the parallel signal (the groups #1 and #2 for providing CAF), and, subsequently, the portion is input to an inverse fast Fourier transform unit (IFFT). Phase rotations are not applied to the remaining portion of the parallel signal and the remaining portion is input to the inverse fast Fourier transform unit (IFFT). A guard interval (GI) is inserted into the signal, to which the inverse fast Fourier transform has been applied by the inverse fast Fourier transform unit (IFFT). Then the signal is converted into a serial signal by a parallel-serial conversion unit (P/S), and a transmission signal is output. Here, the receiving side can be realized by a configuration with which the waveform characteristic quantity can be analyzed, such as the configuration shown in FIG. 8.

<<5.3 Application of Phase Rotations to Duplicated Signals>>

Figure 19:
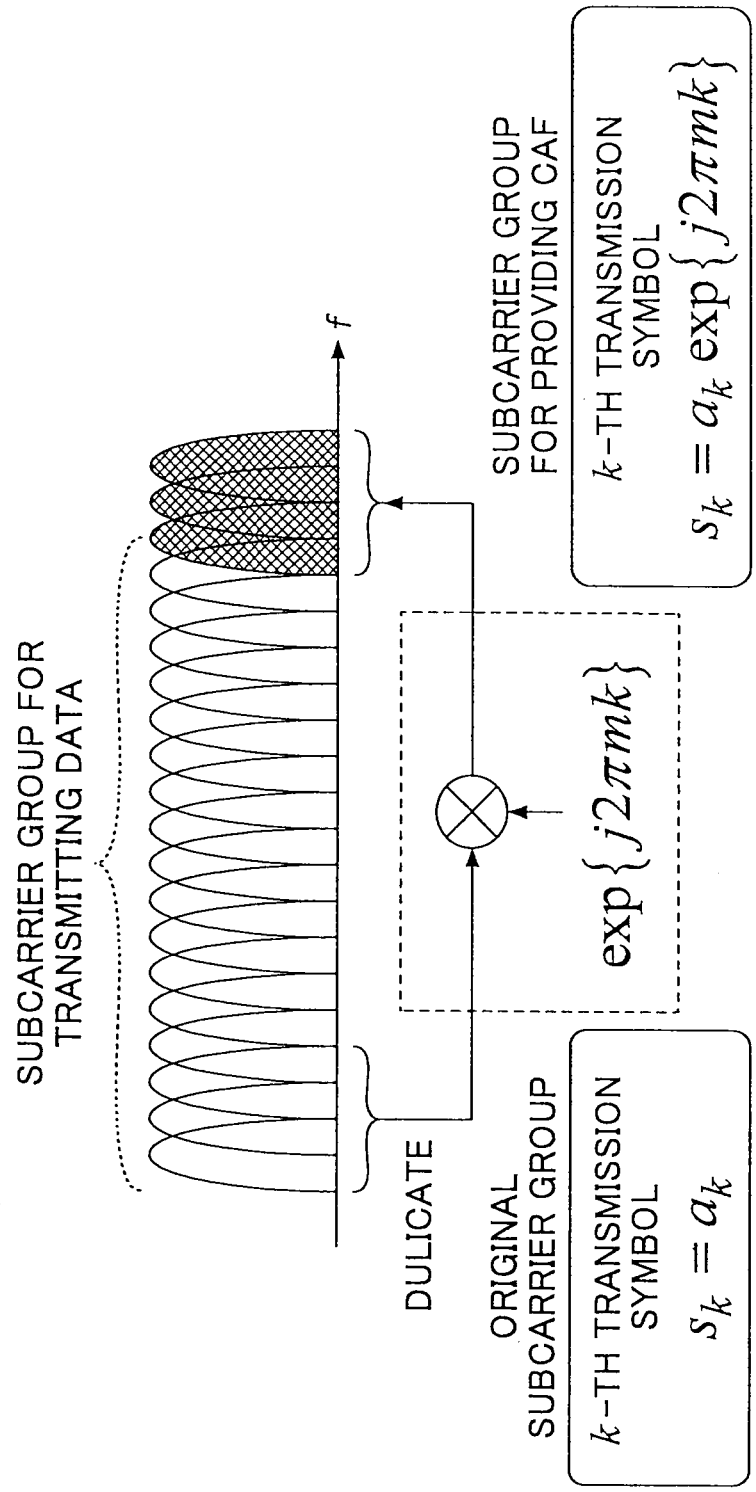
FIG. 19 is a diagram schematically showing a method for realizing a cyclostationality in which phase rotations are applied to duplicated signals.

FIG. 19 is a diagram schematically showing a method of realizing a cyclostationality by applying phase rotations, which are obtained by digitizing a sine wave, to duplicated subcarriers. Data assigned to a k-th signal in a group of subcarriers for providing CAF (SC group for providing CAF) in FIG. 19 is identical to a symbol $a_k$ assigned to the original signal, and a factor applied to the k-th signal is expressed by $\exp(j2\pi mk)$. Namely, a sine wave having a period of (1/m) symbol is digitized, and the values of the digitized sine wave are the factors to be applied to the SC group for providing CAF. This example corresponds to a combination of the method described in 5.1 and the method described in 5.2.

Figure 20:
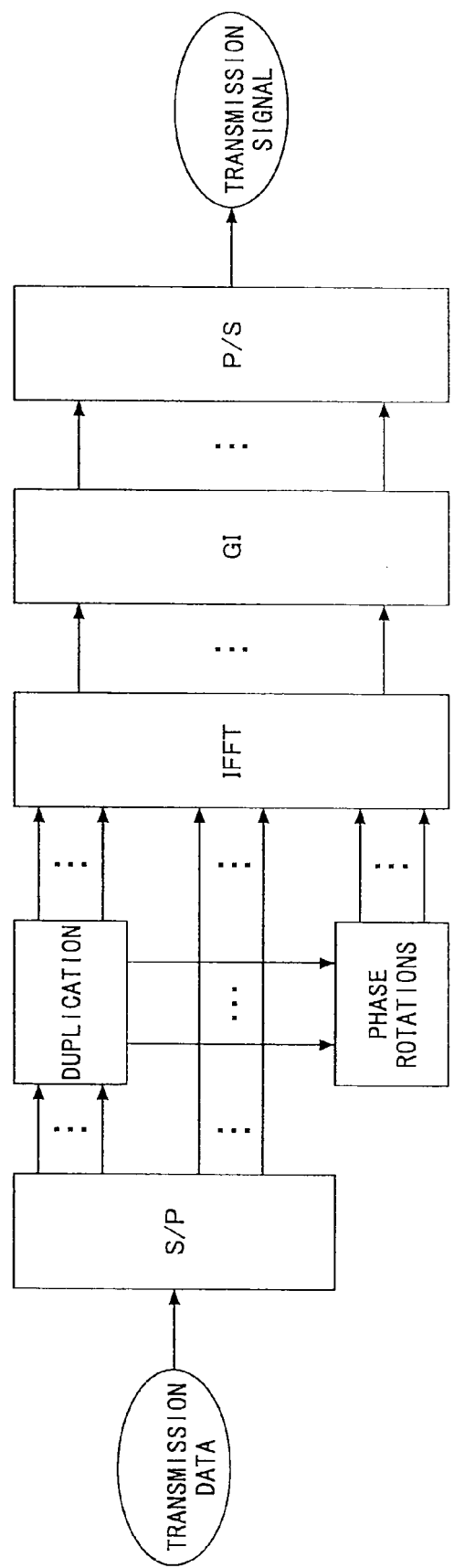
FIG. 20 is a functional block diagram of a transmitting side when the phase rotations are applied to the duplicated signals.

When the plural subcarriers transmit the signals as shown in FIG. 19, a desired waveform characteristic quantity can be attached to a signal by using, for example, a configuration shown in FIG. 20 at the transmission side. Such a configuration is included, at least, in the combination of the waveform characteristic quantity attaching unit 45 and the transmission signal generating unit 46 of the interfered wireless station. In FIG. 20, "TRANSMISSION DATA" is transmission data to which processes, such as a data modulation process, a channel encoding process, and an interleaving process, have been applied. The transmission data is converted into a parallel signal by a serial-parallel conversion unit (S/P). A portion of the parallel signal is duplicated. The phase rotations are applied to the duplicated portion, and, subsequently, the duplicated portion is input to an inverse fast Fourier transform unit (IFFT). Phase rotations are not applied to the remaining portion of the parallel signal and the remaining portion is input to the inverse fast Fourier transform unit (IFFT). A guard interval (GI) is inserted into the signal, to which the inverse fast Fourier transform has been applied by the inverse fast Fourier transform unit (IFFT). Then the signal is converted into a serial signal by a parallel-serial conversion unit (P/S), and a transmission signal is output. Here, the receiving side can be realized by a configuration with which the waveform characteristic quantity can be analyzed, such as the configuration shown in FIG. 8.

<<5.4 Utilization of Time Shift>>

Figure 21:
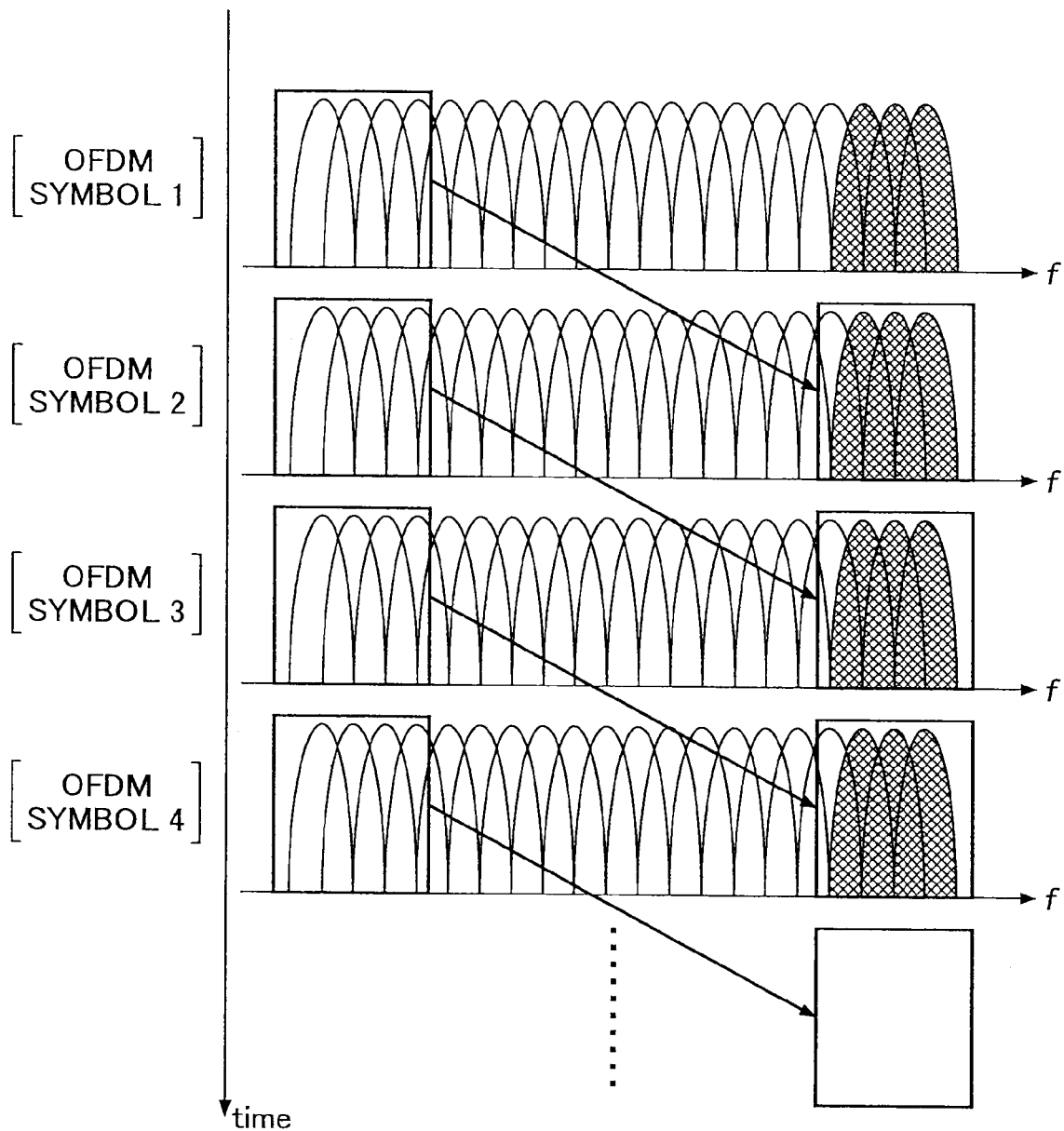
FIG. 21 is a diagram schematically showing a method for realizing a cyclostationality which utilizes a time shift.

FIG. 21 is a diagram schematically showing a method of realizing a cyclostationality using a time shift. In the example shown in FIG. 21, four OFDM signals (OFDM symbols 1-4) are transmitted sequentially in time. In FIG. 21, subcarriers that are surrounded by a first rectangular frame and subcarriers that are surrounded by a second rectangular frame, the first rectangular frame and the second rectangular frame being connected by an arrow, transmit identical signals. Namely, OFDM signals are formed so that first predetermined subcarriers of an OFDM signal transmitted at a first specific time and second predetermined subcarriers of an OFDM signal transmitted at a second specific time transmit identical signals. In this case, a correlation between the signal received at the first specific time and the signal received at the second specific time is high. Specifically, a relatively higher peak of the second order cyclic autocorrelation function (CAF) is obtained when the cyclic frequency α is equal to the value of the frequency interval between the first subcarriers and the second subcarriers, the first subcarriers and the second subcarriers transmitting identical signals, and when the lag parameter ν is equal to the value of the time interval between the first specific time and the second specific time. In this manner, a position at which a peak of the cyclic autocorrelation function (CAF) is obtained may be controlled not only in the direction of the cyclic frequency axis, but also in the direction of the lag parameter axis.

Figure 22:
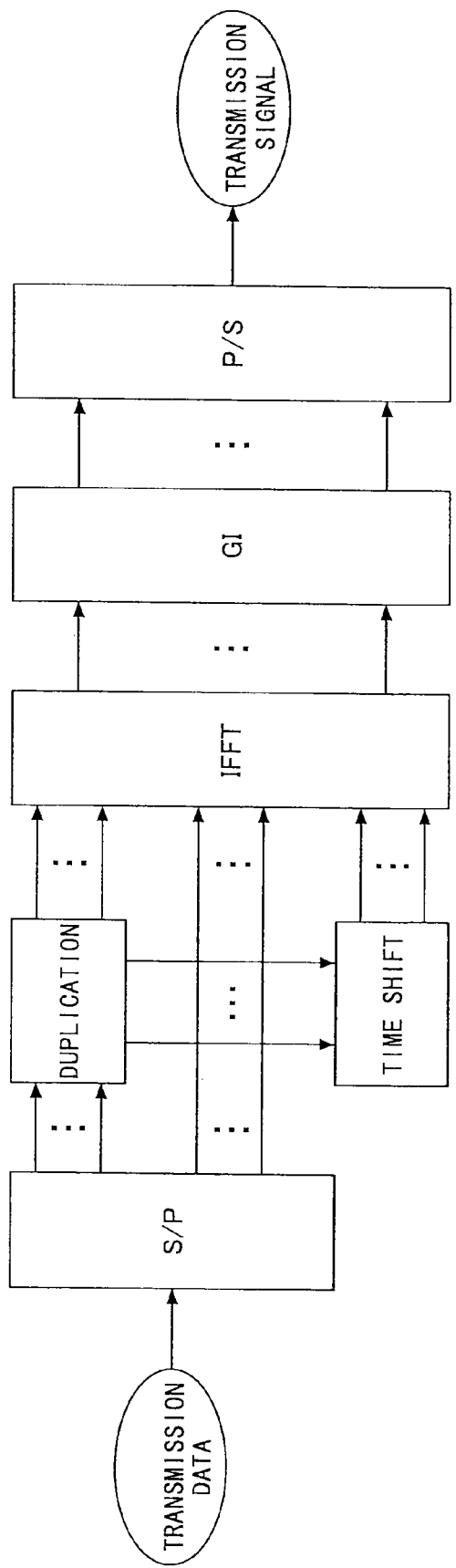
FIG. 22 is a functional block diagram of a transmitting side when the time shift is utilized.

When the plural subcarriers transmit the signals as shown in FIG. 21, a desired waveform characteristic quantity can be attached to a signal by using, for example, a configuration shown in FIG. 22 at the transmission side. Such a configuration is included, at least, in the combination of the waveform characteristic quantity attaching unit 45 and the transmission signal generating unit 46 of the interfered wireless station. In FIG. 22, "TRANSMISSION DATA" is transmission data to which processes, such as a data modulation process, a channel encoding process, and an interleaving process, have been applied. The transmission data is converted into a parallel signal by a serial-parallel conversion unit (S/P). A portion of the parallel signal is duplicated. The duplicated portion is shifted in the direction of the time axis, and, subsequently, the duplicated portion is input to an inverse fast Fourier transform unit (IFFT). The remaining portion of the parallel signal is input to the inverse fast Fourier transform unit (IFFT) without any change. The shift of the duplicated portion in the time axis direction can be realized by storing signals which was processed in the past, and by properly extracting a previous OFDM signal. A guard interval (GI) is inserted into the signal, to which the inverse fast Fourier transform has been applied by the inverse fast Fourier transform unit (IFFT). Then the signal is converted into a serial signal by a parallel-serial conversion unit (P/S), and a transmission signal is output. Here, the receiving side can be realized by a configuration with which the waveform characteristic quantity can be analyzed, such as the configuration shown in FIG. 8.

<<5.5 Utilization of Cyclic Shift>>

Figure 23:
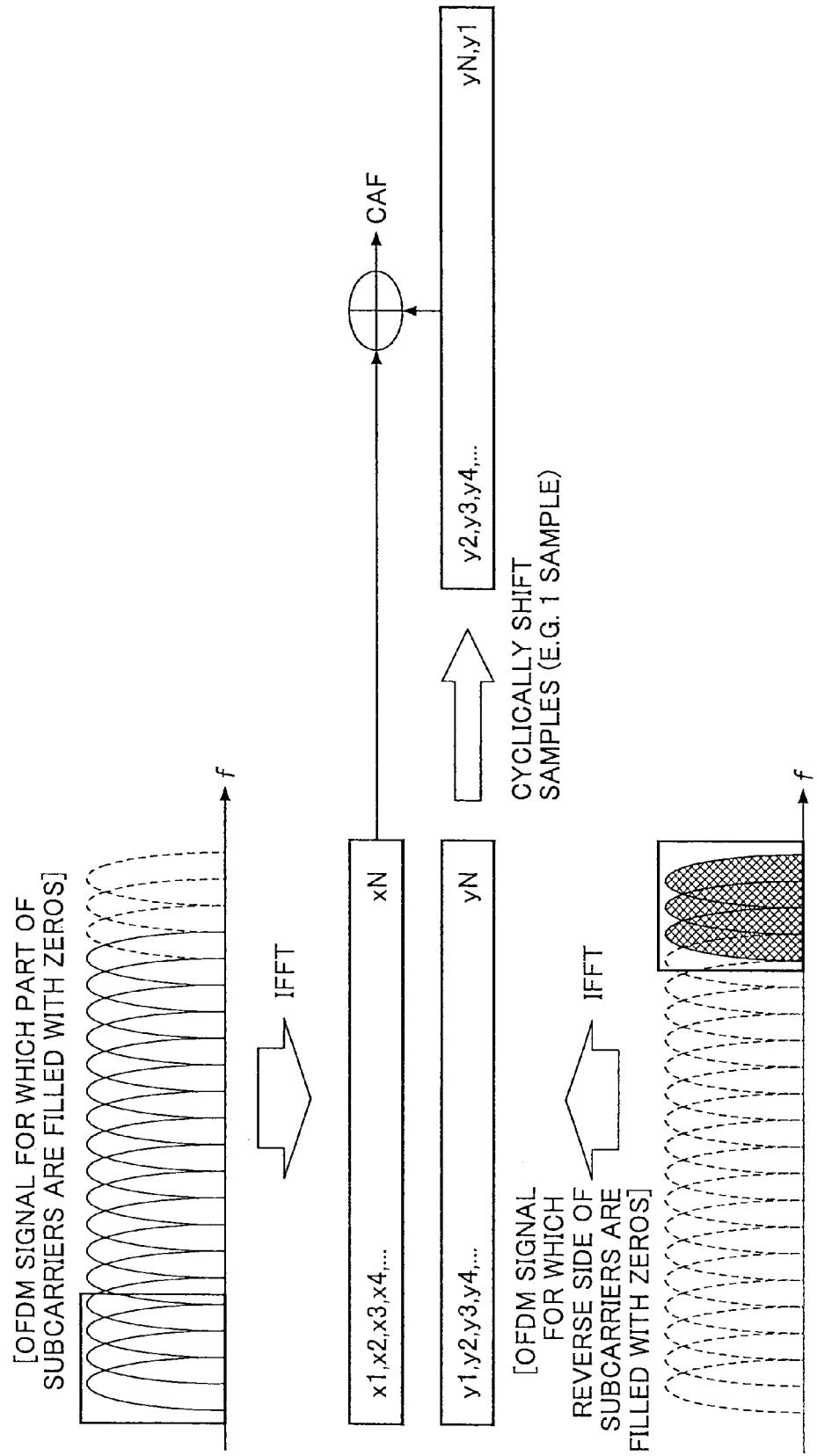
FIG. 23 is a diagram schematically showing a method for realizing a cyclostationality which utilizes a cyclic shift.

FIG. 23 is a diagram schematically showing a method of realizing a cyclostationality using a cyclic shift. In the example shown in FIG. 23, subcarriers that are surrounded by a first rectangular frame and subcarriers that are surrounded by a second rectangular frame transmit identical signals. Here, samples mapped onto subcarriers of an OFDM signal shown at the lower side in FIG. 23 are to be cyclically shifted by a predetermined number of samples (e.g. one sample). For example, suppose that $y_1, y_2, \ldots, y_N$ are N samples mapped onto the subcarriers. When the N samples are cyclically shifted by one sample, the cyclically shifted N samples are $y_2, \ldots, y_N, y_1$. Similarly, when the N samples are cyclically shifted by two samples, the cyclically shifted N samples are $y_3, y_4, \ldots, y_n, y_1, y_2$. In this case, a correlation between the received signal having samples $x_1, x_2, x_3, x_4, \ldots, x_N$ and the signal of which the samples are cyclically shifted is high. Specifically, a peak of the second order cyclic autocorrelation function (CAF) is obtained when the cyclic frequency α is equal to the value of the frequency interval between the original signal and the copied signal, and when the lag parameter ν is equal to the value of the time interval corresponding to the amount of the cyclic shift. In this manner, a position at which a peak of the cyclic autocorrelation function (CAF) is obtained may be controlled not only in the direction of the cyclic frequency axis, but also in the direction of the lag parameter axis.

Figure 24:
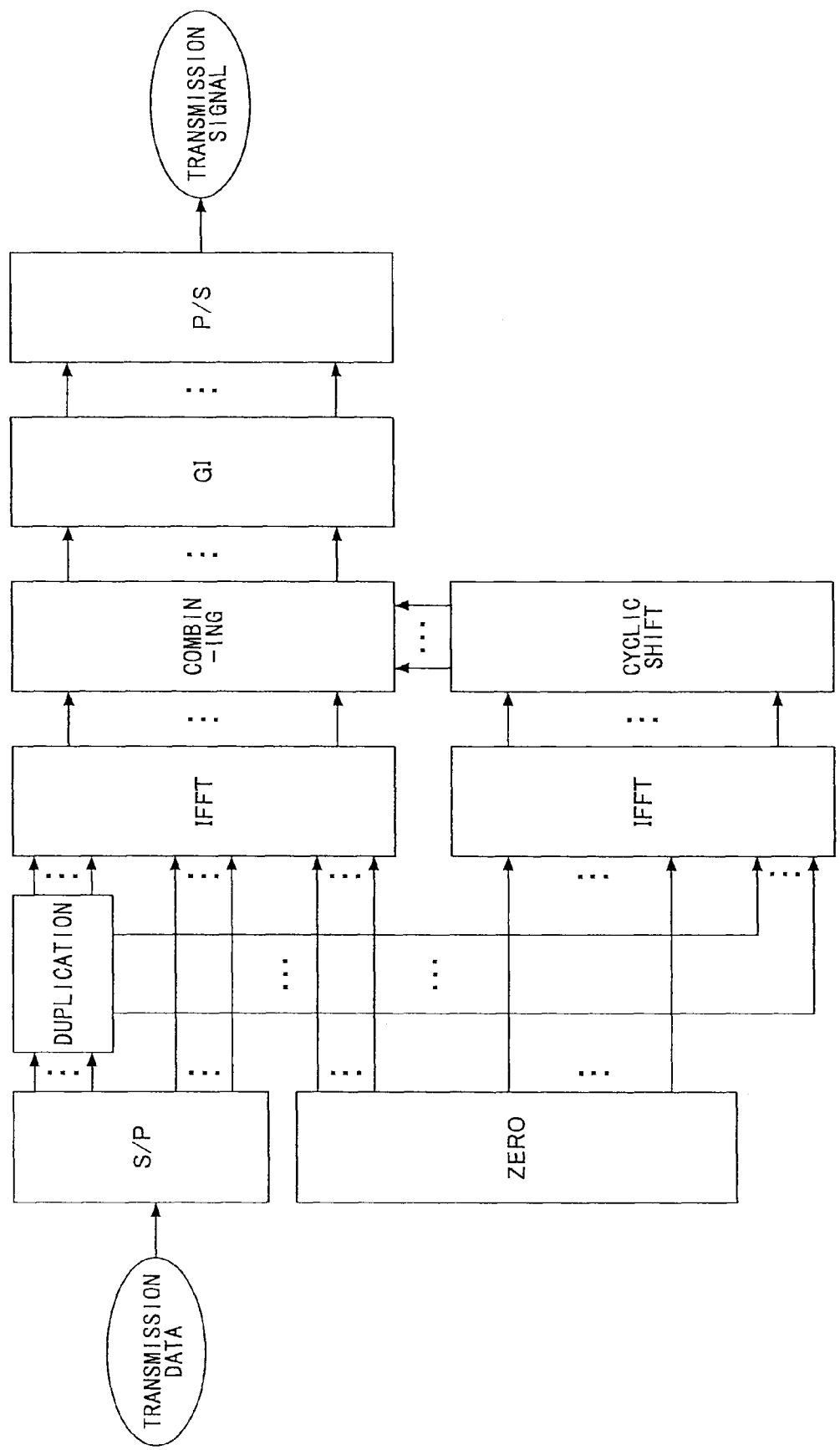
FIG. 24 is a functional block diagram of a transmitting side when the cyclic shift is utilized.

When the plural subcarriers transmit the signals as shown in FIG. 23, a desired waveform characteristic quantity can be attached to a signal by using, for example, a configuration shown in FIG. 24 at the transmission side. Such a configuration is included, at least, in the combination of the waveform characteristic quantity attaching unit 45 and the transmission signal generating unit 46 of the interfered wireless station. In FIG. 24, "TRANSMISSION DATA" is transmission data to which processes, such as a data modulation process, a channel encoding process, and an interleaving process, have been applied. The transmission data is converted into a parallel signal by a serial-parallel conversion unit (S/P). A portion of the parallel signal is duplicated. The duplicated portion is shifted in the direction of the time axis, and, subsequently, the duplicated portion is input to an inverse fast Fourier transform unit (IFFT). After that, the samples corresponding to the inverse fast Fourier transformed duplicated portion of the signal are cyclically shifted in the direction of the time axis. The remaining portion of the parallel signal is input to the inverse fast Fourier transform unit (IFFT) without any change. The signal obtained from the fast Fourier transform unit (IFFT) and the signal obtained by performing the cyclic shift are combined. A guard interval (GI) is inserted into the combined signal. Then the signal is converted into a serial signal by a parallel-serial conversion unit (P/S), and a transmission signal is output. Here, the receiving side can be realized by a configuration with which the waveform characteristic quantity can be analyzed, such as the configuration shown in FIG. 8.

The methods described in 5.1 through 5.5 may be used alone, or two or more of the methods may be combined and used. By combining two or more of the methods, a peak of CAF can be set at an arbitrary combination of a value of the cyclic frequency and a value of the lag parameter.

The embodiments of the present invention are explained above. However, the embodiments are merely exemplifications. A person skilled in the art will understand various modified examples and alternative examples. For example, the embodiments of the present invention may be used in any proper condition where plural communication systems coexist. Such communication systems include a W-CDMA system, an HSDPA/HSUPA based W-CDMA system, an LTE system, an LTE-Advanced system, an IMT-Advanced system, a WiMAX system, and a Wi-Fi system. However, the plural communication systems are not limited by these communication systems. The embodiments are explained using specific numerical examples so as to foster understanding of the embodiments. However, these numerical values are for example purposes only. Unless otherwise noted, any proper numerical values may be used. The embodiments are explained using specific formulas so as to foster understanding of the embodiments. However, these formulas are for example purposes only. Unless otherwise noted, any proper formulas may be used. The classification of the embodiments or the sections is not essential. The items described in more than two sections can be combined and used, if necessary. An item described in one section can be applied to another item described in another section (provided that the application of the item does not contradict). For the sake of simplicity of the explanations, the devices according to the embodiments of the present invention are explained using functional block diagrams. However, such devices may be realized by hardware, software, or a combination thereof. The software may be prepared in any recording mediums, such as a random access memory (RAM), a flash memory, a read-only memory (ROM), an EPROM, an EEPROM, a register, a hard disk drive (HDD), a removable disk drive, a CD-ROM, a database, and a server. The embodiments of the present invention are not limited to the above described embodiments, and various modified examples and alternative examples are included in the embodiments of the present invention, without departing from the spirit of the embodiment.

The present application claims priority based on Japanese Patent Application No. 2011-032649, filed in the JPO on Feb. 17, 2011, and the entire contents of the Japanese Patent Application No. 2011-032649 are incorporated herein by reference.

The invention claimed is:

1. A wireless station in a second communication system, with at least a portion of a first frequency band used in a first communication system and a portion of a second frequency band used in the second communication system being shared or neighboring, the wireless station comprising:
   circuitry configured to
      extract a waveform characteristic quantity expressed by a second order cyclic autocorrelation function, the waveform characteristic quantity indicating a statistical characteristic of an orthogonal frequency division multiplexing (OFDM) signal received from the first communication system;
      determine communication parameters to be used for the wireless station in the second communication system depending on a determination result of whether the extracted waveform characteristic quantity is of a predetermined waveform characteristic quantity for reducing an interference; and
      transmit and receive a wireless communication signal in the second communication system in accordance with the determined communication parameters, wherein
   first predetermined subcarriers of a first signal received from the first communication system at a specific time and a second predetermined subcarriers of a second signal received from the first communication system at another specific time include identical data signals.

2. The wireless station according to claim 1, wherein plural subcarriers of the OFDM signal include identical data signals.

3. The wireless station according to claim 1, wherein predetermined phase rotation factors are multiplied to corresponding subcarriers of the OFDM signal.

4. The wireless station according to claim 1, wherein first signals associated with the first predetermined subcarriers are constructed by duplicating second signals associated with the second predetermined subcarriers and multiplying phase rotation factors to the duplicated second signals.

5. The wireless station according to claim 1, wherein in a signal received from the first communication system, first signals mapped onto the first predetermined subcarriers are equivalent to cyclically shifted second signals, the second signals being mapped onto the second predetermined subcarriers.

6. A method of avoiding an interference between a first communication system and a second communication system, with at least a portion of a first frequency band used in the first communication system and a portion of a second frequency band used in the second communication system being shared or neighboring, the method comprising:
   extracting a waveform characteristic quantity, the waveform characteristic quantity expressed by a second order cyclic autocorrelation function, the waveform characteristic quantity showing a statistical characteristic of an orthogonal frequency division multiplexing (OFDM) signal received from the first communication system;
   determining communication parameters to be used for communication of the wireless station in the second communication system depending on a determination result of whether the extracted waveform characteristic quantity is of a predetermined waveform characteristic quantity for reducing an interference; and
   transmitting and receiving a wireless communication signal in the second communication system in accordance with the determined communication parameters, wherein
   first predetermined subcarriers of a first signal received from the first communication system at a specific time and second predetermined subcarriers of a second signal received from the first communication system at another specific time include identical data signals.

7. A system comprising at least a first communication system and a second communication system, with at least a portion of a first frequency band used in the first communication system and a portion of a second frequency band used in the second communication system being shared or neighboring, wherein
   a first wireless station in the first communication system includes first circuitry configured to
      monitor a reception level of a desired signal used for communication with a first destination;
      generate an orthogonal frequency division multiplexing (OFDM) signal including a predetermined waveform characteristic quantity expressed by a second order cyclic autocorrelation function for reducing an interference when the reception level is lower than a predetermined value; and
      transmit the transmission signal; and
   a second wireless station in the second communication system includes second circuitry configured to
      extract the waveform characteristic quantity of the OFDM signal received from the first wireless station;

determine communication parameters to be used for communication of the second wireless station in the second communication system depending on a determination result of whether the extracted waveform characteristic quantity is of the predetermined waveform characteristic quantity for reducing the interference; and transmit and receive a wireless communication signal in the second communication system in accordance with the determined communication parameters, wherein first predetermined subcarriers of a first signal received from the first communication system at a specific time and second predetermined subcarriers of a second signal received from the first communication system at another specific time include identical data signals.

* * * * *